US009371889B2

(12) United States Patent
Vester

(10) Patent No.: US 9,371,889 B2
(45) Date of Patent: Jun. 21, 2016

(54) MECHANISM FOR GENERATING AN ORBITAL MOTION OR A ROTATION MOTION BY INVERSING A DRIVE DIRECTION OF A DRIVE UNIT

(71) Applicant: Quantifoil Instruments GmbH, Jena (DE)

(72) Inventor: Andreas Vester, Jena (DE)

(73) Assignee: Quantifoil Instruments GmbH, Jena (DE)

( * ) Notice: Subject to any disclaimer, the term of this patent is extended or adjusted under 35 U.S.C. 154(b) by 58 days.

(21) Appl. No.: 14/375,413

(22) PCT Filed: Jan. 31, 2013

(86) PCT No.: PCT/EP2013/051959
§ 371 (c)(1),
(2) Date: Jul. 29, 2014

(87) PCT Pub. No.: WO2013/113849
PCT Pub. Date: Aug. 8, 2013

(65) Prior Publication Data
US 2015/0011348 A1    Jan. 8, 2015

(30) Foreign Application Priority Data

Jan. 31, 2012   (EP) ..................................... 12153385
Jan. 31, 2012   (GB) .................................... 1201651.5

(51) Int. Cl.
*F16H 1/32*   (2006.01)
*B01F 11/00*  (2006.01)
(Continued)

(52) U.S. Cl.
CPC ................ *F16H 1/32* (2013.01); *B01F 9/0001* (2013.01); *B01F 9/10* (2013.01); *B01F 11/0014* (2013.01);
(Continued)

(58) Field of Classification Search
CPC .................. F16H 1/32; F16H 2200/00; F16H 2200/2079; F16H 3/003; F16H 2001/327; F16H 2001/324; F16H 2001/323; F16H 1/321; B01F 9/10; B01F 9/0001; B01F 11/0014; B01F 2015/00642
USPC .................................. 475/162, 163, 175, 294
See application file for complete search history.

(56) References Cited

U.S. PATENT DOCUMENTS 4,990,130 A * 2/1991 Prais ................... B01F 11/0094
366/208
5,188,378 A * 2/1993 Erlenkeuser ........ B25B 23/0035
279/22

(Continued)

FOREIGN PATENT DOCUMENTS

DE   92 06 042 U1   9/1993
DE   93 12 016 U1   10/1993
(Continued)

OTHER PUBLICATIONS

English translation of JP2007237036A, translationportal.epo.org, Nov. 20, 2015.*
(Continued)

*Primary Examiner* — Roger Pang
(74) *Attorney, Agent, or Firm* — Knobbe Martens Olson & Bear LLP

(57) ABSTRACT

A mechanism for switching a sample holder (14, 40) accommodating a fluidic sample (38) between an orbital motion mode for sample mixing, particularly for shaking, and a rotary motion mode for sample separation, particularly for centrifuging, wherein the mechanism comprises a gear element (11) being drivable by a drive unit (42) to move selectively in a first direction (A) or in a second direction (B) being inverse to the first direction (A), an orbital motion generator (2 to 5) configured for generating an orbital motion of the sample holder (14, 40) when being operated in the orbital motion mode, a rotary motion generator (2, 4, 5) configured for generating a rotary motion of the sample holder (14, 40) when being operated in the rotary motion mode, and a one-way clutch arrangement (12, 13) configured for selectively coupling the gear element (11) with the orbital motion generator (2 to 5) to transfer a driving force from the gear element (11) to the orbital motion generator (2 to 5) for generating the orbital motion when the gear element (11) is driven in the first direction (A) and to freewheel when the gear element (11) is driven in the second direction (B) or coupling the gear element (11) with the rotary motion generator (2, 4, 5) to transfer a driving force from the gear element (11) to the rotary motion generator (2, 4, 5) for generating the rotary motion when the gear element (11) is driven in the second direction (B) and to freewheel when the gear element (11) is driven in the first direction (A).

50 Claims, 19 Drawing Sheets

(51) Int. Cl.
   *B01F 9/00* (2006.01)
   *B01F 9/10* (2006.01)
   *F16H 3/00* (2006.01)
   *B01F 15/00* (2006.01)

(52) U.S. Cl.
   CPC ....... *B01F 2015/00642* (2013.01); *F16H 1/321* (2013.01); *F16H 3/003* (2013.01); *F16H 2001/323* (2013.01); *F16H 2001/324* (2013.01); *F16H 2001/327* (2013.01); *F16H 2200/00* (2013.01); *F16H 2200/2079* (2013.01)

(56) References Cited

U.S. PATENT DOCUMENTS

| | | | |
|---|---|---|---|
| 5,511,879 A * | 4/1996 | Fletcher | B01F 11/0014 366/208 |
| 5,564,826 A | 10/1996 | Neumann et al. | |
| 6,190,032 B1 | 2/2001 | Choda | |
| 2006/0177936 A1 | 8/2006 | Shneider et al. | |
| 2009/0086573 A1 * | 4/2009 | Cayley, Sr. | B01F 11/0014 366/343 |
| 2010/0218620 A1 * | 9/2010 | Hoyer | B06B 1/16 73/863.11 |
| 2011/0286298 A1 * | 11/2011 | Zamirowski | B01F 11/0014 366/111 |
| 2015/0036450 A1 * | 2/2015 | Vester | B01F 11/0014 366/108 |
| 2015/0300472 A1 * | 10/2015 | Park | B60W 10/04 475/8 |

FOREIGN PATENT DOCUMENTS

| | | | | |
|---|---|---|---|---|
| EP | 0 569 214 A2 | 11/1993 | | |
| EP | 1393797 A2 * | 3/2004 | ............ | B01F 9/0021 |
| JP | 10 277434 A | 10/1998 | | |
| JP | 2007 237036 A | 9/2007 | | |
| RU | WO 9832838 A1 * | 7/1998 | .......... | B01F 11/0008 |

OTHER PUBLICATIONS

International Search Report for PCT/EP2013/051959 dated Apr. 19, 2013.

International Search Report for PCT/EP2013/051957 dated Apr. 19, 2013.

* cited by examiner

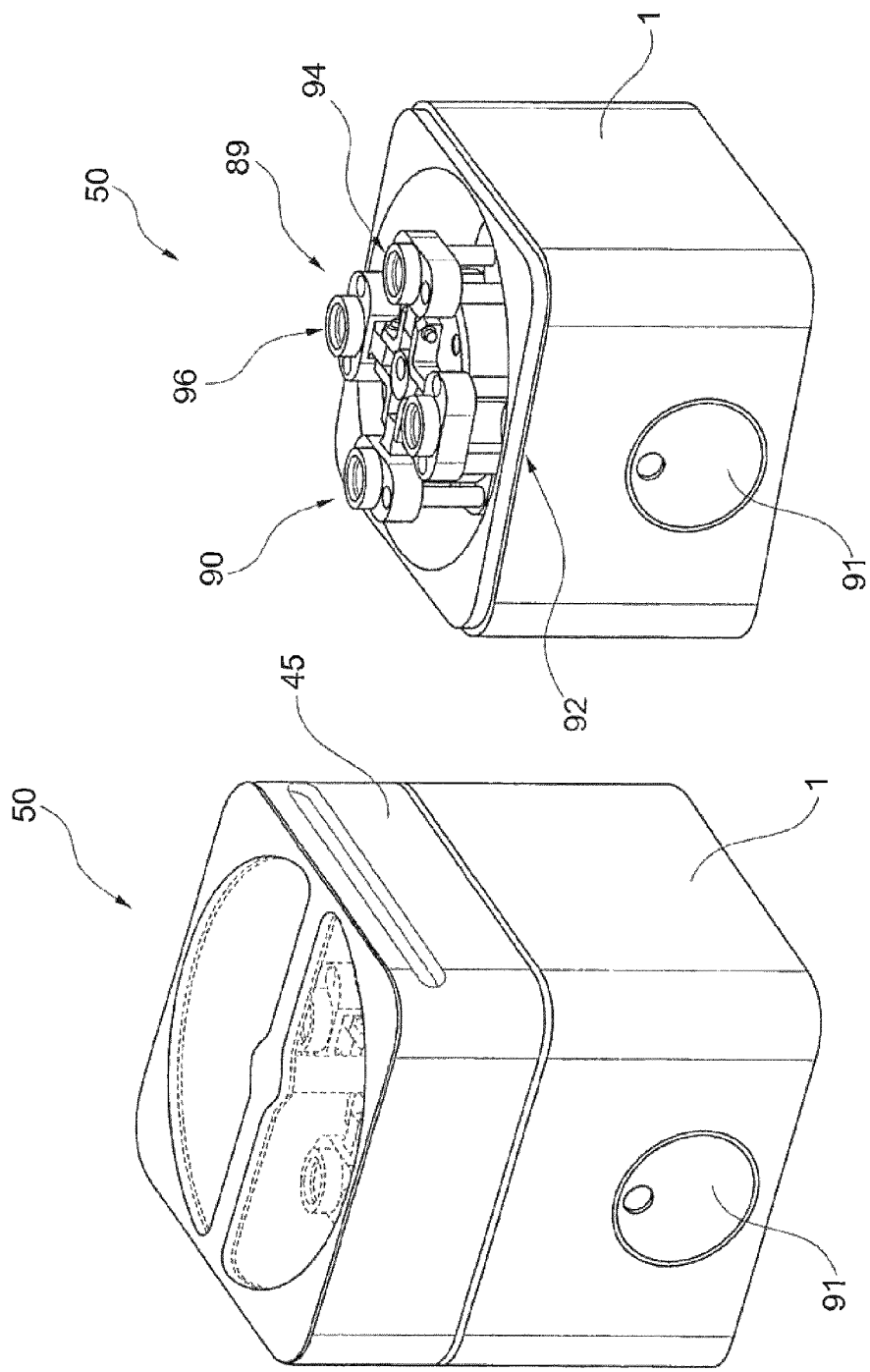

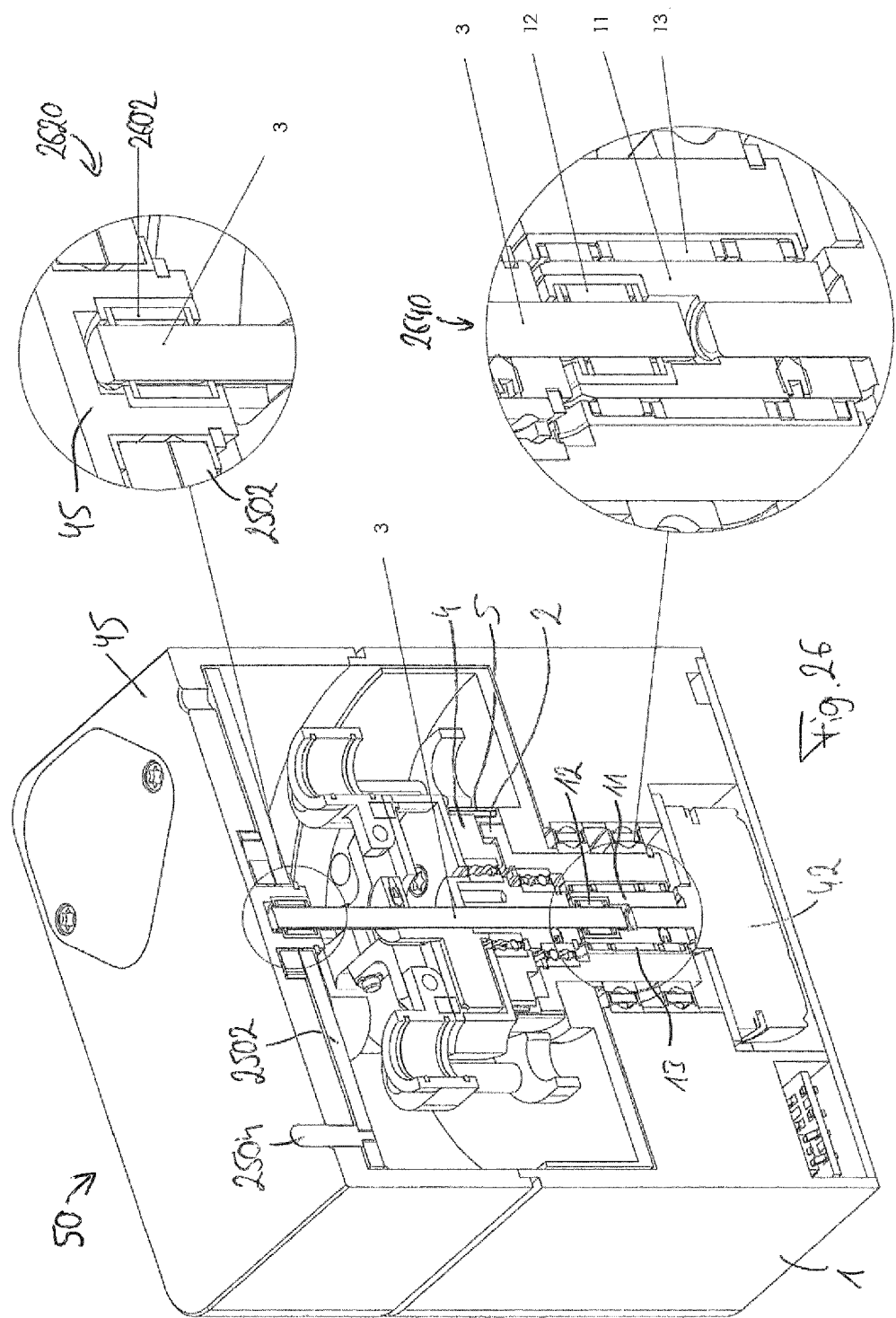

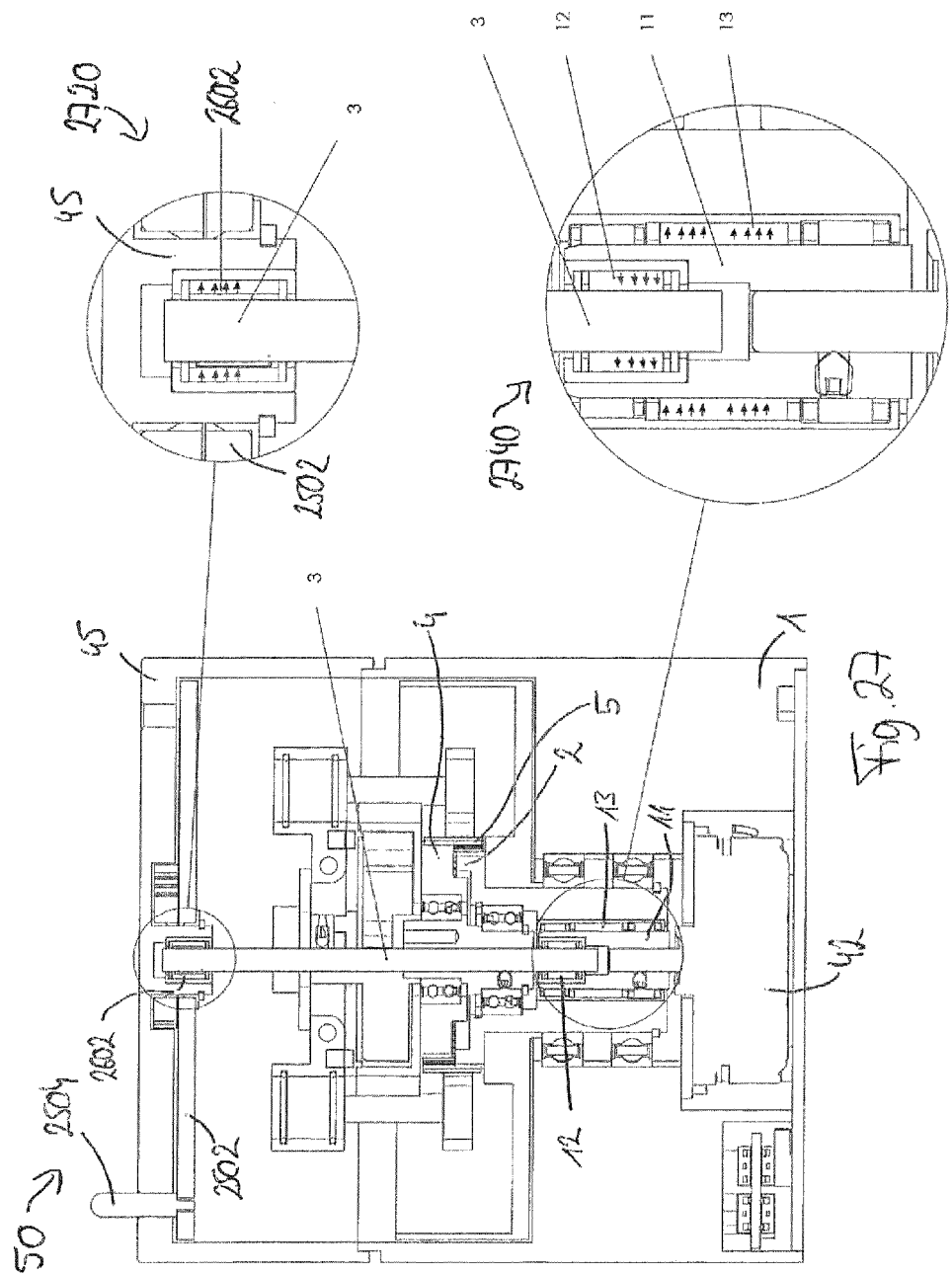

MECHANISM FOR GENERATING AN ORBITAL MOTION OR A ROTATION MOTION BY INVERSING A DRIVE DIRECTION OF A DRIVE UNIT

CROSS REFERENCE TO RELATED APPLICATIONS

This application is a U.S. National Phase Application of PCT International Application Number PCT/EP2013/051959, filed on Jan. 31, 2013, designating the United States of America and published in the English language, which is an International Application of and claims the benefit of priority to European Patent Application No. 12153385.5, filed on Jan. 31, 2012, and British Application No. 1201651.5, filed on Jan. 31, 2012. The disclosures of the above-referenced applications are hereby expressly incorporated by reference in their entireties.

The invention relates to a mechanism for switching a sample holder for accommodating a fluidic sample between an orbital motion mode for sample mixing, particularly for shaking, and a rotary motion mode for sample separation, particularly for centrifuging.

Moreover, the invention relates to an apparatus for selectively operating a sample holder for accommodating a fluidic sample in an orbital motion mode for sample mixing, particularly for shaking, or in a rotary motion mode for sample separation, particularly for centrifuging.

Beyond this, the invention relates to a method of switching a sample holder accommodating a fluidic sample between an orbital motion mode for sample mixing, particularly for shaking, and a rotary motion mode for sample separation, particularly for centrifuging.

US 2010/218620 of the same applicant Quantifoil Instruments discloses a sample handling device for handling a sample, the sample handling device comprising a drive shaft being drivable by a drive unit, a base plate mounted to follow a motion of the drive shaft when being driven by the drive unit, wherein the base plate is configured to receive a sample carrier block mountable to follow a motion of the base plate, and a compensation weight mounted asymmetrically on the drive shaft in a manner to at least partially compensate an unbalanced mass of the sample handling device during the motion.

JP 10277434 discloses a single apparatus to shake, agitate and centrifuge a sample in a tube by providing a shaker for sample mixing, particularly for shaking, a centrifugal tube (sample tube) in the center of a rotor. A shaker shaft is eccentrically fixed to the upper part of a rotor shaft connected to the shaft of a DC motor with an eccentric distance to constitute a shaker. The shaker shaft is freely rotatable through a ball bearing, the upper end is firmly held to a disk, and the upper face of the disk is adhered to the lower face of an oscillator pad. When the motor shaft and rotor shaft are rotated, the shaker shaft is eccentrically rotated with the eccentric distance. Since the shaker is provided in the center of a small-sized centrifuge and integrally housed therein in this way, the sample in a tube is shaken, agitated and centrifuged with only one device, and the device setting space is reduced.

U.S. Pat. No. 4,990,130 discloses a device for imparting sequentially centrifugal force or agitation to a fluid sample placed in the device, comprising a source of power, reversible rotatable motor means, flow communication means extending between said power source and said rotatable motor means, control means in said flow communication means for controlling the direction of rotation of said rotatable motor means, a drive shaft extending from said reversible motor means, a first clutch mounted on said drive shaft, said first clutch fixed for driving with said drive shaft in a first direction, and freely rotatable on said shaft in a second direction, a second clutch mounted on said drive shaft, said second clutch freely rotatable on said drive shaft in said first direction, and fixed for rotation on said shaft in said second direction, a rotor connected to said first clutch, a cam follower mounted for rotation with said rotor, a cam connected to said second clutch, means connected to said control means and movable for preventing rotation of said rotor with said first clutch in said second direction of rotation, and means for supporting fluid samples on each end of said rotor.

JP 2007-237036 discloses to provide a small sized and lightweight agitating and spin-down device for physical and chemical experiments. In this agitating and spin-down device in physical and chemical apparatus, an eccentric cam is provided at the lower face of a movable shaft, two inner and outer one-way clutches controlling rotation and non-rotation are provided between the movable shaft and a rotor stage fit to the upper part, and shaft alignment is performed by making an eccentric amount zero by winding of the eccentric cam accompanied with the normal rotation of a power shaft. A head rubber on the rotor stage is rotated by the rotation control of the one-way clutch, the shaft alignment is released by return of the eccentric cam to the original position accompanied with reverse rotation of the power shaft, the head rubber is switched to vibration by the non-rotation control of the one-way clutch to vibrate and agitate liquid in a test tube on the head rubber, and then agitation liquid attached to the inner face of the test tube is spun down by switching the head rubber to rotation.

Further background art is disclosed in JP 10-277434, U.S. Pat. No. 6,190,032, EP 1,393797, EP 0,462,257, WO 98/32838, EP 0,679,430, US 2011/286298 and US 2009/086573.

However, efficiently generating an orbital motion for sample mixing, particularly for shaking a sample, may still be a challenge. Furthermore, efficiently generating a rotary motion for sample separation, particularly for centrifuging a sample, may still be a challenge.

It is an object of the invention to efficiently enable mixing and separating fluidic samples.

In order to achieve the object defined above, the subject-matter according to the independent claims is provided. Further embodiments are shown by the dependent claims.

According to an exemplary embodiment of the invention, a mechanism (or device) for switching a sample holder accommodating a fluidic sample between an orbital motion mode for sample mixing, particularly for shaking, and a rotary motion mode for sample separation, particularly for centrifuging, is provided, wherein the mechanism comprises a gear element being drivable by a drive unit to move (particularly to rotate) selectively in a first direction or in a second direction being inverse to the first direction, an orbital motion generator configured for generating an orbital motion of the sample holder when being operated in the orbital motion mode, and a rotary motion generator configured for generating a rotary motion of the sample holder when being operated in the rotary motion mode. A one-way clutch arrangement is provided and (particularly a first part or first one-way clutch of the one-way clutch arrangement) is configured for selectively coupling the gear element with the orbital motion generator to transfer a driving force from the gear element to the orbital motion generator for generating the orbital motion when the gear element is driven in the first direction and to freewheel when the gear element is driven in the second direction (i.e. the corresponding functional part of the one-way clutch arrangement may freewheel without transmitting a force when the gear element is driven in the second direction). The one-way clutch arrangement (particularly a second part or second one-way clutch of the one-way clutch arrangement) may be further configured for, in an alternative operation mode, selectively coupling the gear element with the rotary motion generator to transfer a driving force from the gear element to the rotary motion generator for generating the rotary motion when the gear element is driven in the second direction and to freewheel when the gear element is driven in the first direction (i.e. the corresponding other functional part of the one-way clutch arrangement may freewheel without transmitting a force when the gear element is driven in the first direction).

According to another exemplary embodiment of the invention, an apparatus for selectively operating a sample holder accommodating a fluidic sample in an orbital motion mode for sample mixing, particularly for shaking, or in a rotary motion mode for sample separation, particularly for centrifuging, is provided, wherein the apparatus comprises a mechanism having the above mentioned features for switching the sample holder between the orbital motion mode and the rotary motion mode, and comprises the sample holder for accommodating the fluidic sample and being coupled to the mechanism.

According to still another exemplary embodiment of the invention, a method of switching a sample holder accommodating a fluidic sample between an orbital motion mode for sample mixing, particularly for shaking, and a rotary motion mode for sample separation, particularly for centrifuging, is provided, wherein the method comprises driving a gear element to move selectively in a first direction or in a second direction being inverse to the first direction. The method further comprises operating a one-way clutch arrangement for selectively coupling the gear element with an orbital motion generator to transfer a driving force from the gear element to the orbital motion generator for generating the orbital motion when the gear element is driven in the first direction and to freewheel when the gear element is driven in the second direction. According to the method, the one-way clutch is alternatively operated for coupling the gear element with a rotary motion generator to transfer a driving force from the gear element to the rotary motion generator for generating the rotary motion when the gear element is driven in the second direction and to freewheel when the gear element is driven in the first direction.

According to still another exemplary embodiment of the invention, a program element (for instance a software routine, in source code or in executable code) is provided, which, when being executed by a processor (such as a microprocessor or a CPU), is adapted to control or carry out a method having the above mentioned features.

According to yet another exemplary embodiment of the invention, a computer-readable medium (for instance a CD, a DVD, a USB stick, a floppy disk or a hard disk) is provided, in which a computer program is stored which, when being executed by a processor (such as a microprocessor or a CPU), is adapted to control or carry out a method having the above mentioned features.

Orbital or rotary motion generation control which may be performed according to embodiments of the invention can be realized by a computer program, that is by software, or by using one or more special electronic optimization circuits, that is in hardware, or in hybrid form, that is by means of software components and hardware components.

In the context of this application, the term "sample holder" may particularly denote any physical structure delimiting a sample accommodation volume and hence being configured for holding a fluidic sample or a fluidic sample container.

In the context of this application, the term "fluidic sample" may particularly denote a sample comprising a fluid, i.e. a liquid and/or gaseous medium, optionally comprising solid particles as well. Examples for fluidic samples are chemical or biochemical solutions which may comprise, for instance, one or more fractions of cells, proteins, genes, etc.

In the context of this application, the term "orbital motion", particularly orientation-fixed orbital motion, may particularly denote a motion along a trajectory which is obtained when a structure is rotating with a first angular frequency around a first central rotation axis with a superposed additional rotation with a second angular frequency around a second rotation axis, which may be parallel to the first rotation axis. The second angular frequency may have an opposite sign and may have the same absolute value as the first angular frequency.

In the context of this application, the term "rotary motion" may particularly denote a motion along a trajectory which is obtained when a structure is rotating with a certain angular frequency around one rotation axis.

In the context of this application, the term "shaking" may particularly denote a treatment of the fluidic sample for mixing components thereof. Shaking may be performed in a contamination-free and gentle manner by exposing the fluidic sample to an acceleration triggered by orbital motion.

In the context of this application, the term "centrifuging" may particularly denote a treatment of the fluidic sample for separating components thereof into different fractions. Centrifuging may be performed in an efficient manner by rotating the fluidic sample, thereby separating components thereof due to different behavior of different fraction upon exerting a centrifugal force.

In the context of this application, the term "gear element" may particularly denote a physical structure capable of transmitting a force between two members which are mechanically coupled by the gear element. Such a gear element may be a hollow shaft coupling a first member accommodated within the hollow shaft with a second member accommodated around the hollow shaft. Alternatively, such a gear element may be a reciprocating element coupling a member coupled to one section of the reciprocating element with another member coupled to another section of the reciprocating element, etc.

In the context of this application, the term "drive unit" may particularly denote a device capable of generating a mechanical driving force. Such a driving force may be applied by an engine drive unit as engine power, by a user actuating a manual drive via muscle force, etc.

In the context of this application, the term "one-way clutch" may particularly denote a clutch, i.e. a force coupling element, which transmits a drive force between two connected members in one motion direction (for instance in one rotation direction such as a clockwise rotation) but which inhibits or disables transmission of a drive force in another, particularly opposite, direction (for instance in an inverse rotation direction such as a counterclockwise rotation).

In the context of this application, the term "freewheel" may particularly denote a characteristic of a one-way clutch to be incapable of transmitting a drive force to a coupled member in a certain direction so that the one way-clutch rotates freely around the certain direction without taking along the other member.

According to an exemplary embodiment, a mechanism is provided for activating either an orbital motion mode (particularly an orientation-fixed orbital shaking motion) or a rotary motion mode (particularly a centrifuging motion) merely by inversing a drive direction of a drive unit which only provides the drive power. Particularly, a one-way clutch arrangement couples a gear element selectively to an orbital motion generator assembly for generating an orbital motion or to a rotary motion generator assembly for generating a rotary motion of a sample holder accommodating a sample. When the one-way clutch arrangement couples the gear element to one of the orbital motion generator or the rotary motion generator for force transmission, the respectively other motion generator is deactivated by a freewheeling of the one-way clutch arrangement in this coupling direction. The selection whether the orbital motion mode or the rotary motion mode shall be activated can be made merely by selecting a rotation direction of a drive unit such as an electric engine. Therefore, an easily operable dual-mode system is provided allowing to flexibly switch between an orbital mixing mode of the fluidic sample and a centrifuging mode of the fluidic sample merely by changing a rotation direction of the gear element. Hence, both functions may be integrated in a single device.

In the following, further exemplary embodiments of the mechanism will be explained. However, these embodiments also apply to the apparatus, the method, the computer-readable medium and the program element.

In an embodiment, the orbital motion generator and the rotary motion generator may be at least partially constituted by the same components (such as three cogwheels which contribute to the orbital motion generation as well as to the rotary motion generation). In this embodiment, the orbital motion generator and the rotary motion generator may at the same time be at least partially constituted by different components (such as a drive shaft which contributes only to the orbital motion generation, but not to the rotary motion generation).

In an embodiment, the one-way clutch arrangement comprises a first one-way clutch configured for coupling the gear element with the orbital motion generator to transfer the driving force from the gear element to the orbital motion generator for generating the orbital motion when the gear element is driven in the first direction and to freewheel when the gear element is driven in the second direction. Such a one-way clutch arrangement comprises a second one-way clutch (being a separate physical structure than the first one-way clutch) configured for coupling the gear element with the rotary motion generator to transfer the driving force from the gear element to the rotary motion generator for generating the rotary motion when the gear element is driven in the second direction and to freewheel when the gear element is driven in the first direction. Hence, it is possible to constitute the one-way clutch arrangement from two different one-way clutches—one coupling a first section of the gear element with the orbital motion generator and the other one coupling a second section of the gear element with the rotary motion generator. In this scenario, always only one of the two one-way clutches is active for force transmission and the respective other one is inactive or freewheels. This provides a mechanism which allows to select the motion mode merely by adjusting the rotation direction of the gear element.

However, as an alternative to two separate one-way clutches, the one-way clutch arrangement may for instance be also realized by a shiftable locking pin (or any other kind of locking element) in combination with two freewheeling bearings between the gear element on the one hand and the orbital motion generator and the rotary motion generator, respectively, on the other hand. By engaging the locking pin between gear element and orbital motion generator, these two components may be rigidly coupled so that an orbital motion mode is selected. At the same time, the locking pin has no influence on the freewheeling bearing between the gear element and the rotary motion generator so that the rotary motion mode is deactivated in this configuration. Upon shifting the locking pin to another position in which it rigidly couples the gear element with the rotary motion generator while allowing the orbital motion generator to freewheel relative to the gear element by the freewheeling bearing, the rotary motion mode may be selected. The skilled person will understand that other alternatives for realizing the function of the one-way clutch arrangement are possible.

In an embodiment, the first one-way clutch and the second one-way clutch freewheel in opposite directions and lock in opposite directions. For instance, the first one-way clutch may freewheel in a clockwise rotation direction while locking in a counterclockwise rotation direction, or vice versa. The second one-way clutch may then freewheel in the counterclockwise rotation direction while locking in the clockwise rotation direction, or vice versa. Therefore, by selecting a rotation direction of the gear element, it is selectable which one of the one-way clutches locks and which one freewheels.

In an embodiment, the gear element is configured as a hollow shaft. Such a hollow shaft, which may have a tubular or hollow cylindrical geometry, may be directly coupled to a drive unit for providing the driving force or power, such as an electric motor.

In an embodiment, the first one-way clutch is arranged between an interior surface of the hollow shaft and an exterior surface of a drive shaft of the orbital motion generator. The second one-way clutch may be arranged between an exterior surface of the hollow shaft and an interior surface of a movably mounted cogwheel (or a tubular cogwheel extension shaft thereof) of the rotary motion generator. Thus, an outer surface of the hollow cylindrical shaft may be coupled for transmitting rotary motion force, while an inner surface of the cylindrical hollow shaft may be coupled for transmitting orbital motion force. However, the arrangement may be also vice versa.

In an embodiment, the rotary motion generator comprises a selectively lockable first cogwheel in an unlocked movably mounted state, coupled to the gear element via the one-way clutch arrangement and having a plurality of first cogs arranged along an outer circumference of the first cogwheel, and a movably mounted second cogwheel having a plurality of second cogs arranged along an outer circumference of the second cogwheel. A coupling body is provided having a plurality of third cogs arranged along an inner circumference of the coupling body. The coupling body is mounted with the first cogwheel and with the second cogwheel to engage part of the first cogs and part of the second cogs by part of the third cogs to thereby generate the rotary motion of the second cogwheel and a sample holder to be mounted to follow a motion of the second cogwheel upon rotating the gear element in the first direction. In the context of this application, the term "cogs" may particularly denote physical structures such as rips, teeth or any other kind of protrusions of a physical body which are arranged in a sequence for being subsequently (and optionally partially simultaneously) engaged by corresponding cooperating grooves or indentations of another cooperating physical body for providing a force coupling between the physical bodies. Upon activating the rotary motion mode, the gear element may transmit a driving force to the movably configured first cogwheel which, via the coupling body, also drives the second cogwheel which in turn rotates the sample holder for centrifugation.

In an embodiment, the orbital motion generator comprises the selectively lockable first cogwheel in a locked stationarily mounted state and having a first through hole, the second cogwheel having a second through hole, and a drive shaft coupled to the gear element via the one-way clutch arrangement and having a concentric first section and an eccentric second section, wherein the first section is guided through the first through hole and the second section is guided through the second through hole, wherein the coupling body is mounted with the first cogwheel and with the second cogwheel to engage part of the first cogs and part of the second cogs by part of the third cogs to thereby generate the orbital motion of the second cogwheel and a sample holder to be mounted to follow a motion of the second cogwheel upon rotating the gear element in the second direction. In the context of this application, the term "concentric shaft section" may particularly denote a portion of a shaft in length direction which portion has a length axis being aligned to or identical to the rotation axis. In the context of this application, the term "eccentric shaft section" may particularly denote a portion of a shaft in length direction which portion has a length axis being parallel shifted or laterally spaced or displaced with regard to the rotation axis. Hence, by merely locking the first cogwheel to a support body or the like to fix it, a rotation force is transmitted via the eccentric second section of the drive shaft to the second cogwheel. By the weak coupling between the first cogwheel and the second cogwheel mediated by the coupling element, the orbital motion is then automatically generated.

In an embodiment, the mechanism further comprises a cogwheel locking element configured for selectively locking the first cogwheel in the locked stationarily mounted state or for unlocking the first cogwheel in the unlocked movably mounted state. Such a cogwheel locking element may be a locking pin which can be spatially shifted so as to trigger a rigid coupling between the first cogwheel and a support body or the like, or for decoupling these two elements from one another by disengaging the locking pin from the first cogwheel.

In an embodiment, the mechanism further comprises a shaft locking element configured for selectively locking the drive shaft in a locked stationarily mounted state or for unlocking the drive shaft in an unlocked movably mounted state. Also the shaft locking element may be embodied as a shiftable pin which selectably allows to lock the drive shaft to a support body or the like, or to decouple these two components from one another.

In an embodiment, each of the first cogwheel and the second cogwheel is a toothed belt disc and the coupling body is a toothed belt. Such a toothed belt disk may be a disk-shaped or cylindrical body having a curved surface which includes a circumferential arrangement of rips. Correspondingly, the coupling body may be a belt, i.e. made of a flexible material and having indentations which have a shape corresponding to the rips of the first and second cogwheels. Hence, engagement between the rips and the indentations is possible to provide for a form closure based force transmission.

In an embodiment, the mechanism comprises a support body accommodating a part or all of the components of the mechanism and comprises a lid to be attached onto the support body, wherein the support body and the lid are configured to correspond to one another so that upon attaching the lid onto the support body, the mechanism is triggered to be switched from the orbital motion mode to the rotary motion mode. Particularly, a lid attaching sensor may be provided at the lid and/or at the support body which may be configured for sensing attachment of the lid onto the support body and/or detachment of the lid from the support body. Such a provision acts as a safety feature while at the same time allowing a user to easily adjust the rotary motion mode or the orbital motion mode. In this embodiment, when the support body is uncovered (i.e. the lid is detached), the orbital motion or shaking mode is activated. Upon attaching the lid to the support body, a switch may be actuated (for instance based on a sensor signal) which changes rotation direction of the gear element. Merely by taking this measure, the motion mode is changed from the orbital motion mode to the rotary motion mode. Since centrifuging in the rotary motion mode involves in many cases significantly larger rotational forces and hence an increased risk in a lab, activating the centrifuging only upon putting the lid on the support body also increases the safety for a user.

In an embodiment, each of the first cogwheel and the second cogwheel is a sprocket and the coupling body is a sprocket chain. Therefore, several alternatives to a toothed belt configuration of the cogwheels are possible. For instance, a regular arrangement of indentations in a sprocket chain may cooperate with a corresponding arrangement of protrusions in a circumferential surface of a sprocket for force transmission.

In an embodiment, the coupling body is a flexible structure being deformable but basically non-elongatable (a slight elongation might be possible in view of a slight flexibility of the material of the coupling body) upon rotating the drive shaft so as to adapt its shape to follow motion of the second cogwheel while maintaining the coupling between the first cogwheel and the second cogwheel. The term "deformable but non-elongatable" may denote a characteristic according to which the shape of the coupling body may be changed by applying a deforming force, but that the entire length along a circumference of the coupling body may remain constant or basically constant upon applying a deforming force. Hence, the coupling body may have an inelastic behavior. By manufacturing the coupling body as a slightly flexible, but non-expandable structure, a weak coupling between the two cogwheels is enabled which provides for the necessary force transmission to generate an orbital motion. The coupling body may for instance be an annular structure made of a bendable material such as rubber covered by a non-expandable fabric or web so as to show, as a whole, the described properties.

In an alternative embodiment, the coupling body is a rigid, non-deformable structure which, upon rotating the drive shaft, follows, as a whole, motion of the second cogwheel while maintaining the coupling between the first cogwheel and the second cogwheel. In contrast to the previously described embodiment, the coupling body can also be configured as an undeformable solid body (for example made of plastic), for instance a ring with an internal toothing.

In an embodiment, the coupling body is a closed annular structure, particularly a structure being quasi-rotationally symmetric in a force-free state. Such a ring-like structure may be basically rotationally symmetric with the particularity that the internal toothing provides for a slight deviation as compared to a completely rotationally symmetric arrangement.

In an embodiment, the coupling body is an annular structure having an inner diameter which is larger than an outer diameter of the first cogwheel and the second cogwheel, particularly about one times of an eccentricity of the second section of the drive shaft larger. The largest inner extension of the coupling body may be larger, by the eccentricity, than the diameter of one of the cogwheels. The term "eccentricity" may denote a spatial, lateral shift of the eccentric portion (more particularly of a center of gravity thereof) as compared to the concentric portion (more particularly of a center of gravity thereof) and the rotation axis of the shaft.

In an embodiment, a number of the first cogs is the same as a number of the second cogs. In this case a smooth and low friction rolling of the two cogwheels on one another, coupled by the coupling element, can be obtained.

In an embodiment, the number of the first cogs and the number of the second cogs is smaller than a number of the third cogs. If the number of third cogs is larger than the number of the first cogs and the number of the second cogs, it can be ensured that in each operation mode only a portion of the first and second cogs is contacted by the third cogs, thereby promoting the desired orbital motion.

In an embodiment, in the orbital motion mode, a coupling force resulting from the form closure of the coupling body with both the first cogwheel and the second cogwheel is larger than a friction force (for instance a bearing force or bearing load in bearings of the device) between the first cogwheel and the second cogwheel. The form closure is generated by an engagement of the cogs of the cogwheels between cogs of the coupling body. The friction force between the cogwheels has the tendency to prevent relative motion between the cogwheels, while the coupling force triggers such a motion. By configuring the bearings, materials, surface roughness, driving force, etc., correspondingly, the requirement of a coupling force exceeding the friction force can be met.

In an embodiment, in the orbital motion mode, the coupling body is mounted with the first cogwheel and with the second cogwheel so as to form a form closure which superposes, to a rotating motion of the second cogwheel transmitted by the drive shaft, a rolling motion of the second cogwheel during which the second cogwheel rolls up on the coupling body limited by a rolling motion during which the coupling body rolls up on the first cogwheel. The two overlaid rotations of the second cogwheel with two parallel rotation axes allows for the generation of the orbital motion. This particularly holds when the two rotational frequencies have the same absolute values but opposite signs.

In an embodiment, the mechanism comprises a drive unit, particularly an electric motor, being configured for moving, particularly rotating, the gear element. However, it is also possible that the drive unit is a handle or the like which is operable by a user so as to initiate rotation by muscle force.

In an embodiment, the mechanism comprises a compensation weight mounted asymmetrically on the drive shaft and being configured so as to at least partially compensate for a mechanical load acting on the drive shaft upon generating the orbital motion. By providing a compensation weight which is mounted asymmetrically on the drive shaft (for instance shaped as a half disk) it is possible to compensate for unbalanced forces acting around the circumference of the drift shaft in the orbital motion mode. Therefore, by providing such a compensation weight, wear of the mechanism may be efficiently suppressed. The system may also comprise a mechanism for spatially fixing the compensation weight upon switching from the orbital motion mode to the rotary motion mode. Such a mechanism may be realized as a pin on a lid for covering a support body, wherein covering the support body with the lid may press the pin against the compensation weight thereby preventing motion of the compensation weight in the centrifuging mode.

In an embodiment, the force flow for the orbital motion mode goes from the drive unit, via the gear element, one of the one way clutches, an eccentric drive shaft, to the sample holder. The force flow for the rotary motion mode goes from the drive unit, via the gear element, another one of the one way clutches, cooperating cogwheels, to the sample holder.

In an embodiment, the mechanism further comprises a locking one-way clutch configured for coupling a drive shaft of the orbital motion generator with a stationary housing so as to selectively lock the drive shaft with the stationary housing to a locked stationarily mounted state when the gear element is driven in one direction, or to freewheel in an unlocked movably mounted state of the drive shaft when the gear element is driven in another (particularly the opposite) direction. In such an embodiment, the provision of a locking element (such as a slidable pin drivable in a groove of the shaft) for locking an eccentric drive shaft to prevent its orbital rotation during a rotary motion mode can be omitted. The simple provision of a locking one-way clutch to prevent orbital rotation of an eccentric drive shaft during a rotary motion mode allows to automatically achieve such a locking effect without the need to actively control a slidable locking element to drive in engagement with or out of engagement with the shaft.

In an embodiment, the stationary housing comprises a lid which is detachably connectable (or connected) to and/or pivotably mounted (so as to be pivotable between a closed housing state and an open housing state) on a spatially fixed support body of the stationary housing, wherein the locking one-way clutch is configured for coupling the drive shaft with the lid. Thus, the automatic locking arrangement may be easily accessible at a top of the mechanism where a lot of space is available for such a provision.

In an embodiment, the one direction equals to the second direction and the other direction equals to the first direction. Therefore, it can be ensured that the disablement of the eccentric shaft rotation occurs selectively in the rotary motion mode, but not in the orbital motion mode.

In an alternative embodiment (which does not have a locking one-way clutch), the mechanism further comprises a locking element configured for selectively locking a drive shaft of the orbital motion generator in a locked stationarily mounted state, particularly in the rotary motion mode, or for unlocking the drive shaft in an unlocked movably mounted state, particularly in the orbital motion mode. Such an alternative embodiment has the advantage that, whenever desired, a shaft motion may be safely disabled—not limited to a situation in which the shaft shall be prevented against rotation in an undesired direction. This provides a user with a high degree of freedom to control of the entire mechanism in accordance with any user preferences.

In an embodiment, the second one-way clutch is arranged to circumferentially surround the first one-way clutch. This allows to obtain a very compact mechanism with a particularly low height. In view of the high forces which may act on the mechanism during centrifuging and orbital mixing, such a flat construction offers a high degree of safety in operation.

In an embodiment, the first one-way clutch and the second one-way clutch are arranged concentrically around a rotation axis of the mechanism, particularly around a rotation axis of a concentric portion of a drive shaft of the orbital motion generator. Particularly, the mechanism may have a lower portion (i.e. juxtaposed to a bottom of the device) with a concentric arrangement and may have an upper portion (i.e. juxtaposed to the sample holder) with an eccentric arrangement. The one-way clutch arrangement may entirely form part of the concentric bottom arrangement which may keep the mechanical load acting on the one-way clutch arrangement small.

In an embodiment, the first one-way clutch and the second one-way clutch are arranged at at least overlapping height ranges, particularly extend over the same height range, in relation to a (particularly vertical) rotation axis of the mechanism, particularly in relation to a rotation axis of a drive shaft of the orbital motion generator. Also this contributes to the compact construction of the mechanism.

In an embodiment, the one-way clutch arrangement is mounted so as to be immovable along a rotation axis of the mechanism, particularly around a rotation axis of a drive shaft of the orbital motion generator. By maintaining the one-way clutch arrangement spatially fixed along a rotation axis of the mechanism during both the rotary motion mode and the orbital motion mode, the technical effort for moving components remains very small. This allows to operate the mechanism with a low amount of energy and keeps the construction simple and robust against failure. Hence, the one-way clutches may be assembled so as to be disabled to be displaced in a translative way along the vertical or rotation axis. However, in the rotary motion mode one of the one-way clutches rotates around the rotation axis of the hollow shaft/of the drive unit, and in the orbital motion mode the other one of the one-way clutches rotates around the rotation axis of the hollow shaft/of the drive unit.

In an embodiment, the gear element comprises a hollow shaft being located (particularly laterally) between the first one-way clutch and the second one-way clutch so as to surround the first one-way clutch and to be surrounded by the second one-way clutch. Therefore, a simple tubular gear element may organize both operation of components within the first one-way clutch as well as operation of components surrounding the second one-way clutch merely by adjusting the present rotation direction of the tubular gear element.

In an embodiment, the orbital motion generator comprises a drive shaft having an eccentric section being eccentric with regard to a rotation axis around which the gear element is rotatable driven by the drive unit, wherein the eccentric section extends through the sample holder, particularly through a recessed sample holder plate of the sample holder. Thus, the eccentric portion of the shaft may act directly on the sample holder without any further components in between. This results in a simple, failure-robust and spatially uninterrupted force transmission from the eccentric shaft section to the sample holder rendering the mechanism compact, light in weight and accurate.

In an embodiment, the drive shaft has a concentric section being concentric with regard to the rotation axis, wherein at least a part of the concentric section, but not the eccentric section, is surrounded by at least a part of the one-way clutch arrangement. Thus, a clear spatial separation between a concentric portion including the force transmitting one-way clutches on the one hand and an eccentric portion on the other hand can be implemented.

In an embodiment, the concentric section forms a bottom part of the drive shaft and the eccentric section forms a top part of the drive shaft. The terms "bottom" and "top" refer to an ordinary use position of the mechanism in which the sample containers are arranged above the drive and force transmission components.

In an embodiment, the drive shaft extends over or bridges the entire range from the drive unit to the sample holder. Therefore, a single stiff member may transfer the driving force from the drive unit to the sample holder to thereby ensure a failure robust orbital motion operation.

In an embodiment, the mechanism comprises cooperating cogwheels forming part of both the orbital motion generator and the rotary motion generator. A force transmission via two cogwheels which may be coupled by a coupling body (such as a toothed belt) is a rigid, simple and accurately reproducible way of transferring force. More precisely, the coupling body transfers a rotative motion from a lower cogwheel to an upper cogwheel during the rotary motion mode (for centrifugation), similar as in a belt drive. In the orbital motion mode, the coupling body prevents a turning of the upper cogwheel relative to the lower cogwheel. In other words, the upper cogwheel maintains its spatial orientation with regard to the lower cogwheel during the orbital revolution. Thus, there is a force coupling between the cogwheels in the orbital motion mode.

In an embodiment, the mechanism comprises a drive shaft to be coupled to the gear element via the one-way clutch arrangement and forming part of the orbital motion generator, but not of the rotary motion generator. Thus, construction of the partially eccentric drive shaft may be focused specifically to the task of transmitting an orbital motion.

In the following, further exemplary embodiments of the apparatus will be explained. However, these embodiments also apply to the mechanism, the method, the computer-readable medium and the program element.

In an embodiment, the sample holder comprises one or more accommodation sections each having an accommodation recess each configured for receiving a container including one or more fluidic samples. In one embodiment, exactly one fluidic sample is treated by the apparatus. Such a sample may be accommodated within a vial or any other container. It is however also possible that an arrangement of multiple fluidic samples is treated for mixing and/or centrifuging in the same apparatus at the same time. For instance, a circumferential arrangement of accommodation recesses and corresponding samples may be provided. Alternatively, it is also possible that for instance two dimensional arrays of samples are treated by the apparatus such as well plates or the like. For instance, a 96 well plate sample holder may be used in conjunction with the apparatus. With regard to suitable sample holders, it is possible to have four tubes, four well plates, any other number of tubes or well plates, common or separate structures for accommodating them, multiple samples, etc.

In an embodiment, each of the one or more accommodation sections is mounted to be pivotable around a pivoting axis being perpendicular to a rotation axis of the orbital motion and the rotary motion so as to be pivoted only upon exceeding a predefined rotation force. By mounting the accommodation sections to be pivotable allows to increase the centrifuging efficiency while rotating the sample holders.

It is also possible to operate the apparatus in combination with an automatic sample transfer system. For example, it is possible to pipette fluidic samples into sample containers of the apparatus. It is also possible to provide a temperature adjustment unit within the apparatus, for instance to perform PCR (Polymerase Chain Reaction) with the fluidic samples. It is also possible that the apparatus itself includes detector components such as an optical detector for detecting separated components of the sample. Alternatively, it is possible to move the apparatus into a separate detection system. For instance, a robot driven gripper arm may grip the apparatus and may transfer the apparatus towards a detector position.

It is possible that the samples are cooled (for instance by injecting an air stream into the interior accommodation space of the apparatus) or heated during centrifuging and/or during mixing.

Merely as examples, apparatuses according to exemplary embodiments of the invention may be realized as one or more of the following: an orbital shaker for lab containers; an orbital shaker for well plates with a flat construction and a high mixing frequency; a combination of an orbital shaker and a centrifuge for lab containers (also well plates); a combination of orbital shaker, centrifuge and a homogenizer (such a function may be implemented, for instance by a linear motion of a rotor, for instance reciprocating upwardly and downwardly); integration of an automatic container locking (for instance an edge locking mechanism); an integration of a sample supply and/or sample remove unit or a pipette device; integration of an evaluation device (for instance an optical detector); integration of a precise positioning unit for positioning fluidic sample containers (for example, the containers may be pivoted at defined points in order to provide for a sample supply or an evaluation here); integration of a temperature adjustment unit; etc.

The aspects defined above and further aspects of the invention are apparent from the examples of embodiment to be described hereinafter and are explained with reference to these examples of embodiment.

The invention will be described in more detail hereinafter with reference to examples of embodiment but to which the invention is not limited.

FIG. 10 illustrates a sample handling apparatus according to an exemplary embodiment of the invention in an operation mode in which a lid is attached to cover an interior of a support body.

FIG. 11 shows the sample handling apparatus of FIG. 10 in an operation mode in which the lid is detached.

FIG. 26 shows a three dimensional cross-sectional view of the sample handling apparatus of FIG. 25 together with two details illustrating certain features thereof.

FIG. 27 shows a planar cross-sectional view of the sample handling apparatus of FIG. 25 together with two details illustrating certain features thereof.

The illustration in the drawing is schematically. In different drawings, similar or identical elements are provided with the same reference signs.

Exemplary embodiments of the invention allow to operate an apparatus in an operation mode in which an orientation fixed orbital motion is possible. A corresponding embodiment of the invention therefore relates to a mechanism for transferring a rotation motion of a driving motor into an orientation fixed orbital motion which is advantageous for a contamination free mixing of samples in lab containers. In this kind of motion, a shaking shelf board with at least one lab container attached thereto is moved with an angular frequency $\omega_1$ around a rotational axis of a drive unit. In order to keep the spatial orientation of the lab container constant, the shaking shelf board can additionally be rotated by an angular frequency $\omega_2$ around an axis which is not identical with an axis of the drive unit but which is parallel to this axis with a distance r0 (eccentricity/orbital radius). In order to maintain this spatial orientation of the shaking shelf board, which is not essential but advantageous, during the rotation, the condition $-\omega_1=\omega_2$ shall be fulfilled.

In contrast to such an orbital motion, centrifugation denotes a sample separation procedure which is based on a different behavior of different molecules in the gravitational field. The gravitational field required for separating such components thereby defines or determines the technical effort for realizing the separation. Therefore, a sufficiently high gravitational force shall be generated artificially. For this purpose, it is possible to rotate the samples within the containers around a certain spatial axis. In the thus generated centrifugal field, the separation procedures are more efficiently and faster as in the gravitational field of the earth, since the required separation forces can be significantly higher. Also a separation of mixtures of fractions of a fluidic sample with very small differences concerning density can be made possible by this procedure.

In biotechnology, centrifugation can be used for separating cells after fermentation, separating of cell fragments after cell exposure, the separation of precipitated or crystallized products from liquids and the separation of liquid systems (extraction). Another application of centrifugation in a biotechnological lab is to collect sample amounts adhering to the surface of the container after execution of tempering or mixture procedures by a centrifugal force in direction of the bottom of the container, for sample collection.

Figure 1:
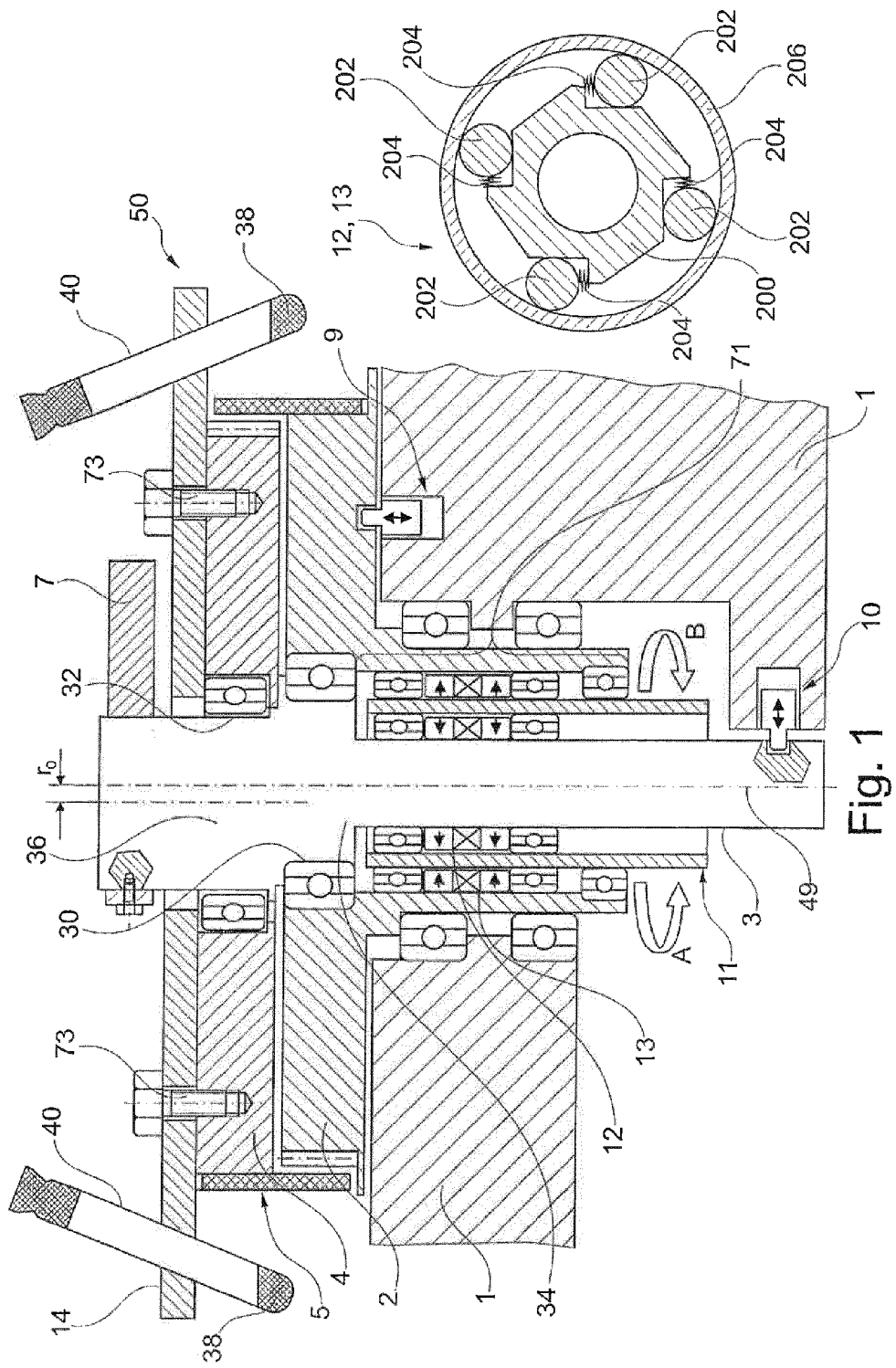
FIG. 1 shows a sample handling apparatus according to an exemplary embodiment of the invention for selectively operating a sample holder accommodating fluidic samples in an orbital motion mode for shaking or in a rotary motion mode for centrifuging.

FIG. 1 illustrates a sample handling apparatus 50 according to an exemplary embodiment of the invention.

The apparatus 50 comprises a sample holder constituted by a recessed sample holder plate 14 and tubes or test glasses 40 mounted on the sample holder plate 14. As can be taken from FIG. 1, fluidic samples 38 such as biological liquids are accommodated within the test glasses 40. The apparatus 50 combines two functions in one device, i.e. a shaking function by which the liquid samples 38 are shaken for mixing purposes and a rotary function by which the liquid samples 38 are centrifuged for separating components or fractions thereof.

The sample holder 14, 40 is coupled to a mechanism for switching the sample holder 14, 40 between the orbital motion mode (for shaking) and the rotary motion mode (for centrifuging).

This mechanism comprises a hollow cylindrical shaft 11 as a gear element which can be rotated selectively in a first rotation direction A or in a second rotation direction B around a rotation axis 49. The second rotation direction B is opposite or inverse to the first rotation direction A. The rotation can be powered by a drive engine (not shown in FIG. 1).

Reference numerals 2, 3, 4 and 5 denote components of an orbital motion generator which is configured for generating the orbital motion of the sample holder 14, 40 when the apparatus 50 is operated in the orbital motion mode for mixing in accordance with the first rotation direction A. Furthermore, reference numerals 2, 4 and 5 denote components of a rotary motion generator which is configured to generating a rotary motion of the sample holder 14, 40 when the apparatus 50 is operated in the rotary motion mode in accordance with the second rotation direction B. Reference numerals 12 and 13 denote independently operating components of a one-way clutch arrangement, embodied as a first one-way clutch 12 and a second one-way clutch 13. The skilled person is aware of the fact that a one-way clutch may freewheel in one rotation direction, thereby disabling a force transmission between two connected components, while it enables a force transmission between two connected components in the opposite rotation direction. The two one-way clutches 12, 13 freewheeling in opposite directions are provided for switching between the centrifuging mechanism and the orbital shaking mechanism. Coupling between the two one-way clutches 12, 13 is performed by the hollow shaft 11.

A detail in FIG. 1 shows an example as to how a one-way clutch 12, 13 may be configured. A plurality of circumferentially arranged balls 202 are connected via biasing springs 204 to a central hub 200. The balls 202 are further sandwiched between the hub 200 and an exterior annulus 206. In clockwise direction, rotation of the hub 200 is disabled (for reasons of form closure or force closure), while it is enabled in counterclockwise direction.

As can be taken from FIG. 1, the first one-way clutch 12 is arranged between the hollow shaft 11 and a drive shaft 3. The one-way clutch 12 is configured in such a way that the driving force from the rotated hollow shaft 11 can be transferred to the orbital motion generator 2 to 5 for generating the orbital motion when the hollow shaft 11 is rotated in the first direction A. In other words, the first one-way clutch 12 couples the hollow shaft 11 with the drive shaft 3 when the first motion direction A of the hollow shaft 11 is activated. In contrast to this, the first one-way clutch 12 freewheels when the hollow shaft 11 is rotated in the second direction B. In this operation mode, no force transmission from the hollow shaft 11 to the drive shaft 3 is possible.

The second one-way clutch 13 is configured for coupling the hollow shaft 11 with the rotary motion generator 2, 4, 5, particularly with a first cogwheel 2 of the rotary motion generator 2, 4, 5, to transfer the driving force from the rotating hollow shaft 11 to the rotary motion generator 2, 4, 5 for generating the rotary motion when the hollow shaft 11 is driven in the second direction B. In other words, in this operation mode, force is transmitted from the hollow shaft 11 rotating in direction B via the second one-way clutch 13 to the first cogwheel 2, more precisely to a shaft extension 71 of the first cogwheel 2. In contrast to this, the second one-way clutch 13 freewheels, i.e. does not transmit a force from the rotating hollow shaft 11 to the extension shaft 71 of the first cogwheel 2, when the hollow shaft 11 rotates in the first direction A.

Hence, by simply adjusting the rotation direction of the hollow shaft 11, it is possible for a user to select either the rotary motion mode or the orbital motion mode.

Most specifically, the rotary motion generator 2, 4, 5 comprises the selectively lockable first cogwheel 2. When the mechanism is operated in the rotary motion mode, the first cogwheel 2 is unlocked by correspondingly operating a cogwheel locking element 9. The cogwheel locking element 9 is configured for selectively locking the first cogwheel 2 to a support body 1 (see operation mode shown in FIG. 1) or for unlocking the first cogwheel 2 to assume the unlocked movably mounted state required for the rotary motion mode (in which the cogwheel locking element 9 is not in engagement with the first cogwheel 2, not shown in the figure). In the rotary motion mode, the cogwheel locking element 9 does not protrude into a corresponding recess in the first cogwheel 2. Therefore, the first cogwheel 2 can freely rotate relative to the support body 1 in the rotary motion mode. The first cogwheel 2 is coupled to the hollow shaft 11 via the second one-way clutch 13 and has a plurality of first cogs (see reference numeral 80 in FIG. 6 to FIG. 9) arranged along an outer circumference of the substantially disk-shaped first cogwheel 2.

A second cogwheel 4, also contributing to the rotary motion generator 2, 4, 5, is arranged on top of the first cogwheel 2 and is mounted in a permanently movably way. Hence, the second cogwheel 4 cannot be fastened in the present embodiment, but can freely follow a rotation motion when a corresponding rotation force is exerted to the second cogwheel 4. The second cogwheel 4 also has a plurality of second cogs arranged along an outer circumference of the second cogwheel 4 (see reference numerals 82 in FIG. 6 to FIG. 9).

Furthermore, a toothed belt 5, also contributing to the rotary motion generator 2, 4, 5, is provided as a deformable but non-elongatable coupling body which encloses or surrounds the entire circumference of both the first cogwheel 2 and the second cogwheel 4. The toothed belt 5 has, as can best be taken from reference numeral 84 in FIG. 6 to FIG. 9, a plurality of third cogs arranged along an inner circumference of the toothed belt 5. The toothed belt 5 is mounted with regard to the first cogwheel 2 and with regard to the second cogwheel 4 so as to engage, in each state during the rotation, a corresponding part of the first cogs 80 and a corresponding part of the second cogs 82 by a corresponding part of the third cogs 84.

In this way, the rotary motion of the second cogwheel 4 and of the sample holder 14, 40 (rigidly connected to the second cogwheel 4 by fastening elements such as screws 73) is generated when the hollow shaft 11 is rotated in the second direction B. This transmits force from the hollow shaft 11 via the second one-way clutch 13 to the first cogwheel 2, and from the first cogwheel 2 via the toothed belt 5 to the second cogwheel 4 and from the second cogwheel 4 to the sample holder 14, 40.

For centrifugation by the rotary motion, the locking device 10 connects drive shaft 3 with the support body 1, whereas locking device 9 is not in engagement with the first cogwheel 33. Via a rotary drive (direct drive or transmission by means of gears) a rotation of the hollow shaft 11 in direction B is generated. The introduced torque is transmitted at the exterior diameter of the hollow shaft 11 via the second one-way clutch 13 locking in this direction onto the cogwheel 2. The first one-way clutch 12 does not transmit any torque in this rotation direction B and freewheels. Via the toothed belt 5, the torque is transmitted towards the second cogwheel 4 which is thereby brought into rotation. By means of drive shaft 3, locked by means of locking device 10, a defined alignment of the drive shaft 3 is achieved during centrifugation, on the other hand the equilibration mass or compensation weight 7 fastened to the drive shaft 3 is prevented from rotating (by bearing friction).

The orbital motion generator 2 to 5 is formed by the first cogwheel 2, the second cogwheel 4, the toothed belt 5 and additionally drive shaft 3. For executing the orbital motion mode, the first cogwheel 2 needs to be brought into a locked stationary mounted state as shown in FIG. 1. This is performed by the cogwheel locking element 9, which is embodied as some kind of displaceable pin, which is brought in engagement with a recess in the first cogwheel 2 as shown in FIG. 1 so that the first cogwheel 2 is stationary locked to the support body 1 as a result of the form closure with the cogwheel locking element 9.

As can furthermore be taken from FIG. 1, the first cogwheel 2 has a central first through hole 30. Also the second cogwheel 4 has a central second through hole 32. The above mentioned drive shaft 3 is guided through the first through hole 30 and is guided through the second through hole 32 and is coupled to the hollow shaft 11 via the first one-way clutch 12. The drive shaft 4 is constituted by different sections including a concentric first section 34 and an eccentric second section 36 (eccentricity r0). The first section 34 is guided through the first through hole 30, whereas the second section 36 is guided through the second through hole 32.

The toothed belt 5 is mounted with the first cogwheel 2 and with the second cogwheel 4 so as to engage part of the first cogs 80 and part of the second cogs 82 by part of the third cogs 84 also in the orbital motion mode to thereby generate the orbital motion of the second cogwheel 4 and the sample holder 14, 40 upon rotating the hollow shaft 11 in the first direction A. Again, the sample holder 14, 40 follows motion of the second cogwheel 4 since it is permanently fastened to the second cogwheel 4 by means of the fastening elements, in the shown embodiment the screws 73. This transmits force from the hollow shaft 11 via the first one-way clutch 12 to the drive shaft 3, and from the drive shaft 3 to the second cogwheel 4 and from the second cogwheel 4 to the sample holder 14, 40. The weak coupling between movable cogwheel 4 and fixed cogwheel 2 mediated via toothed belt 5 provides for two superposed rotation motions of the cogwheel 4, i.e. an orbital motion.

In the orbital motion mode, a coupling force resulting from the form closure of the toothed belt 5 with both the first cogwheel 2 and the second cogwheel 4 is larger than a friction force between contacting surfaces of the first cogwheel 2 and the second cogwheel 4. Hence, the toothed belt 5 is mounted with the first cogwheel 2 and with the second cogwheel 4 so as to form a form closure which superposes, to a rotating motion of the second cogwheel 4 transmitted by the drive shaft 3, a rolling motion of the second cogwheel 4 during which the second cogwheel 4 rolls up on the toothed belt 5 limited by a rolling motion during which the toothed belt 5 rolls up on the first cogwheel 2.

FIG. 1 also shows a non-rotationally symmetric compensation weight 7 (for instance shaped as a half disc) which is mounted asymmetrically on the drive shaft 3 and is configured to compensate for a mechanical load acting on the drive shaft 3 upon generating the orbital motion. The equilibration mass or compensation weight 7 is used for balancing out unbalanced masses. The compensation weight 7 is used for the shaking operation mode only, but not for centrifuging, because in the centrifuging mode the opposing sample holder sections automatically balances out the effects of uncompensated weights.

For mixing in the orbital motion mode, the locking device 9 connects cogwheel 2 with the support body 1, whereas locking device 10 is out of engagement with drive shaft 3. Via a rotary drive (direct drive or transmission by means of an additional gear) a rotation of the hollow shaft 11 in direction A is generated. The introduced torque is transmitted at an inner diameter of the hollow shaft 11 via one-way clutch 12 locking in this direction onto the drive shaft 3 with the eccentric section 36, which also rotates in direction A. The second one-way clutch 13 which is fastened to the cogwheel 2 transmits no torque in this direction and freewheels. In view of the toothed belt 5 being always in engagement, an orientation fixed orbital motion results at the shaking shelf board or sample holder 14. By the co-rotating equilibration or compensation weight 7, an unbalanced mass is at least partially compensated.

Thus, by the mere definition of the rotation direction (A or B) of the hollow shaft 11 powered by a not shown drive unit such as an electric motor, the complementary arrangement of the one-way clutches 12 and 13 ensures that at each time either the orbital motion mode or the rotary motion mode is activated. The apparatus 50 provides for a mechanism for generating an orientation fixed orbital movement when the drive shaft 3 is driven. In contrast to this, a centrifugation motion (rotation) can be activated by changing the rotation direction of the hollow shaft 11 by merely inverting the rotation direction of the drive unit powering the hollow shaft 11. Therefore, a single apparatus 50 is sufficient for providing both an orbital motion for shaking the fluidic sample 38 or a rotary motion for centrifuging the fluidic sample 38. Thus, the apparatus 50 provides for both, a gentle mixing of a sensitive biological sample 38 with an orbital motion, and an efficient separation of different fractions of the biological sample 38 by centrifugation. For adjusting a respective operation mode, a user merely has to adjust the rotation direction of the drive unit for driving the hollow shaft 11. The mechanism for generating the shaking motion along an orbital trajectory can be realized by the two cooperating cogwheels 2, 4 driven by drive shaft 3, wherein the cogwheels 2, 4 are weakly coupled by the toothed belt 5. By additionally providing the one-way clutches 12, 13 freewheeling into two opposite directions and therefore also blocking into opposite directions, the shaking function can be integrated in the same apparatus 50 as a centrifugation function. Thus, the operation of two separate devices is avoided and a sample transfer procedure to be performed by a user or an automatic handling device can be omitted.

The actual drive unit (not shown) such as an electric motor can be aligned with the axis of the drive shaft 3. However, it is alternatively possible to arrange the drive unit laterally displaced with regard to the drive shaft 3, for instance by transmitting the drive force of the drive unit via a force transmission belt or the like to the drive shaft 3. Such a lateral geometry may result in a low height of the apparatus 50.

FIG. 1 furthermore shows that an optional shaft locking element 10 can be provided which can also be embodied as a displaceable locking pin which can either be brought, for the rotary motion mode, in engagement with the drive shaft 3 for selective locking of the drive shaft 3 to the support body 1 (as shown in FIG. 1), or which can be brought, for the orbital motion mode, in a non-engaging state for unlocking the drive shaft 3 with respect to the support body 1.

As alternatives to the hollow shaft 11, another gear element such as a cylinder or a pin or shank may be implemented as well.

With regard to the cogwheel system, both cogwheels 2, 4 may have the same number of cogs or teeth. The eccentricity r0 of the drive shaft 3, i.e. the axis distance of shaft section 36 with regard to the rotation axis 49, can be a multiple integer of the distance of adjacent cogs or teeth on the circumferences of the cogwheels 2, 4. Some deviation from an integer value may be possible so as to provide for some clearance as well. The toothed belt 5 with the interior toothing may have a slightly larger inner diameter (for instance larger by about the eccentricity r0) as compared to the outer diameter of each of the cogwheels 2, 4. Then, the desired weak coupling between the two cogwheels 2, 4 can be mediated via the toothed belt 5.

Drive shaft 3 has its eccentric section 36 being eccentric with regard to rotation axis 49 around which the gear element 11 is rotatable when driven by the drive unit 42. The eccentric section 36 extends through recessed sample holder plate 14 of the sample holder 14, 40. The drive shaft 3 further has its concentric section 34 concentric with regard to the rotation axis 49, wherein the concentric section 34, but not the eccentric section 36, is surrounded by the one-way clutches 12, 13. The concentric section 34 forms a bottom part of the drive shaft 3 and the eccentric section 36 forms a top part of the drive shaft 3. The drive shaft 3 bridges and extends over the entire range from the drive unit 42 to the sample holder 14, 40.

Figure 2:
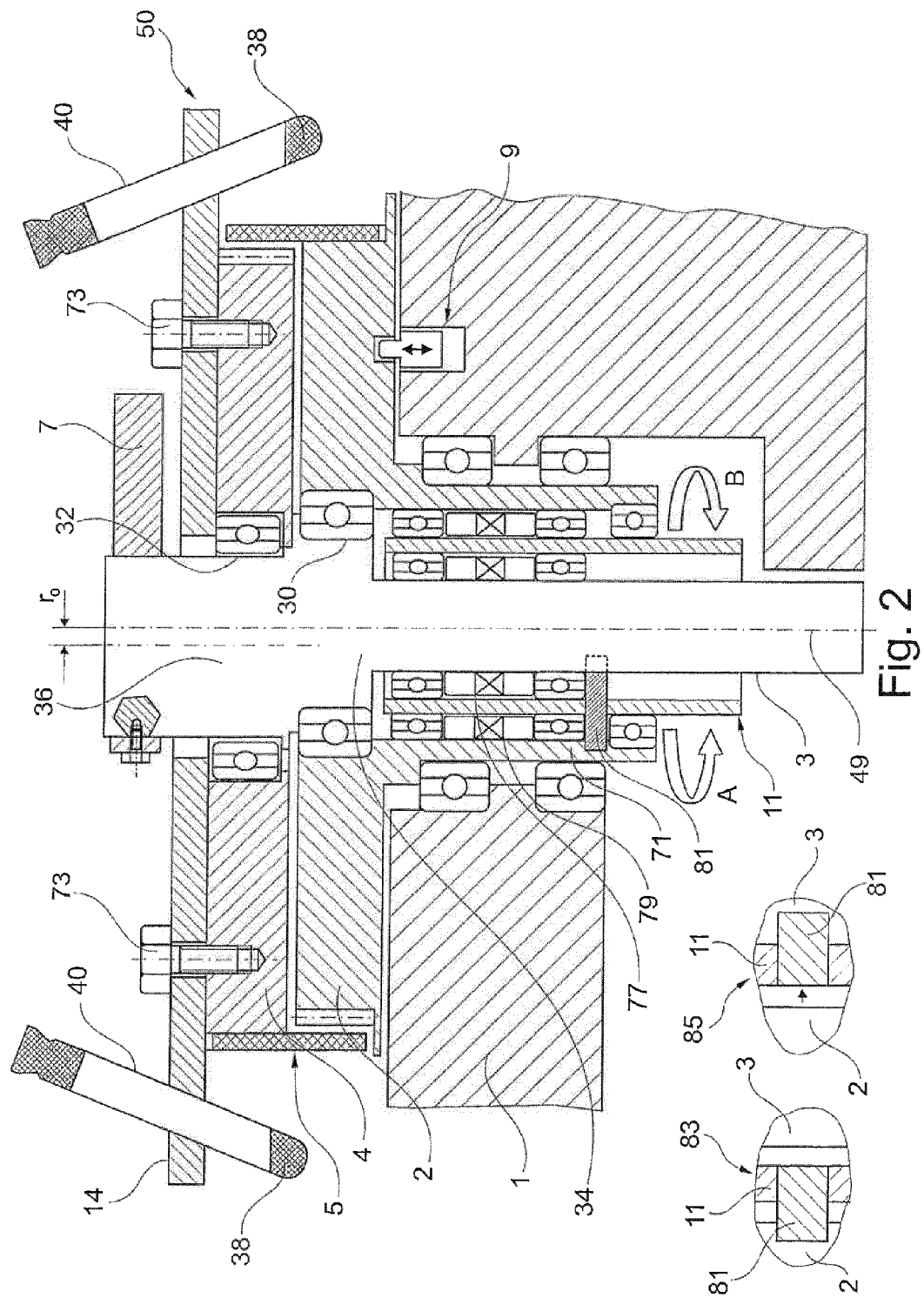
FIG. 2 shows a sample handling apparatus according to another exemplary embodiment of the invention for selectively operating a sample holder accommodating fluidic samples in an orbital motion mode for shaking or in a rotary motion mode for centrifuging.

FIG. 2 illustrates an apparatus 50 according to another exemplary embodiment of the invention.

In the embodiment of FIG. 2, the two one-way clutches 12, 13 are substituted by bearings 77, 79. Both bearings 77, 79 couple the hollow shaft 11 to the first cogwheel 2 and to the drive shaft 3 so that no force is transmitted via these freewheeling bearings 77, 79. In other words, the bearings 77, 79 freewheel in both opposing directions.

In the shown embodiment, the one-way clutch arrangement is realized by a one-way clutch pin 81 cooperating with the freewheeling bearings 77, 79. As can be taken from a detail shown in FIG. 2, the one-way clutch locking pin 81 can be brought in a first position 83 or in a second position 85. By shifting the pin towards the first position 83, the one-way clutch locking pin 81 rigidly couples the hollow shaft 11 with the first cogwheel 2, while in this operation moment the hollow shaft 11 is continuously freely rotatable relative to the drive shaft 3. In contrast to this, in the operation mode 85, the one-way clutch locking pin 81 has been shifted to the right hand side so that the hollow shaft 11 can freely rotate relative to the first cogwheel 2. In contrast to this, the drive shaft 3 is now rigidly coupled with the hollow shaft 11. In other words, the pin 81 in combination with the bearings 77, 79 freewheeling in both directions provide for the one-way clutch arrangement characteristic.

Furthermore, the optional shaft locking pin 10 is omitted in FIG. 2 but can be foreseen in this embodiment as well. Although not essential, shaft locking pin 10 may be advantageous as well since frictional forces in bearings might otherwise result in a rotation or torsion of the shaft 3. In a low friction or frictionless state, shaft locking pin 10 may be omitted.

Figure 3:
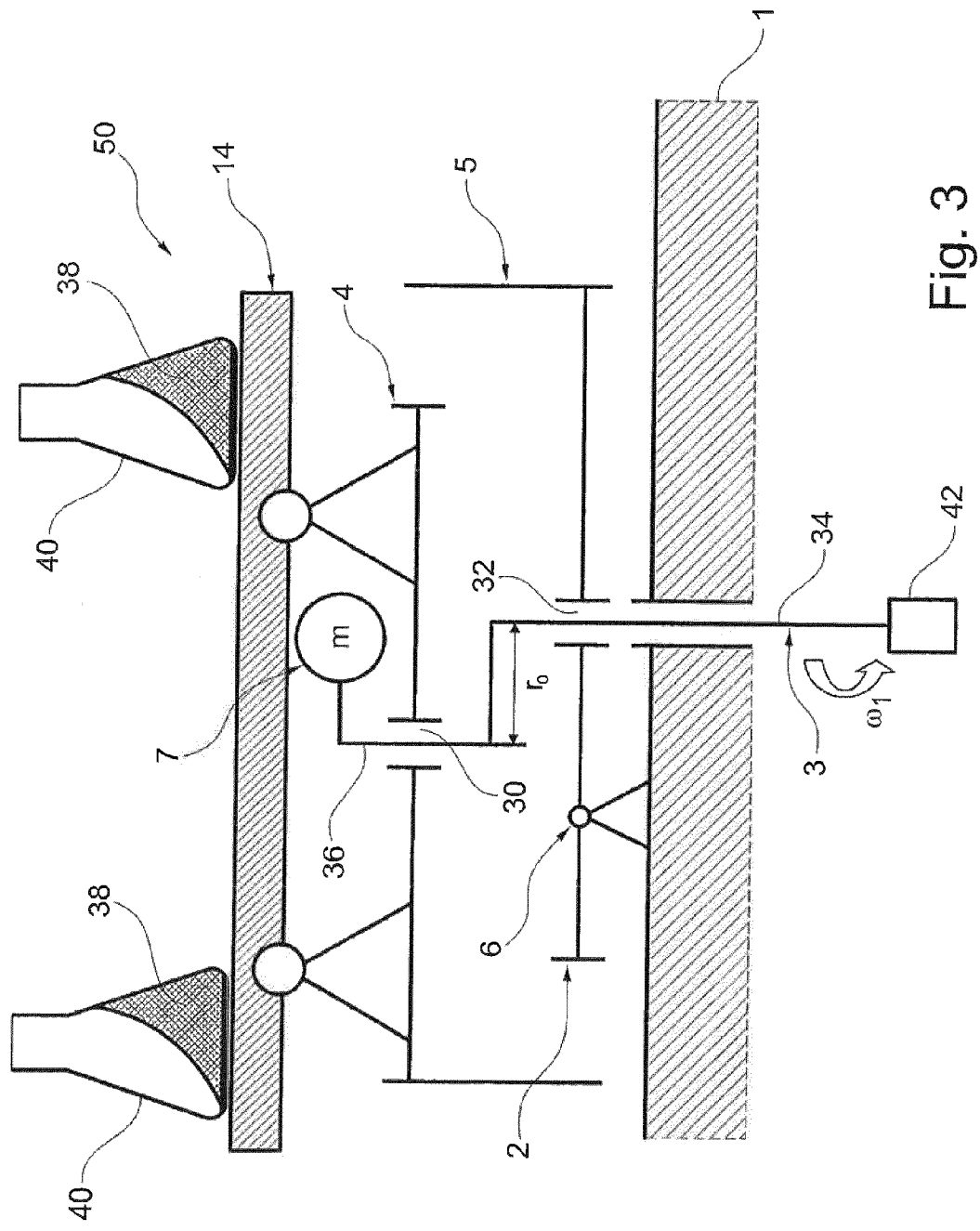
FIG. 3 illustrates schematically a functioning principle of mechanisms and apparatuses according to exemplary embodiments of the invention providing for an orbital motion mode.

FIG. 3 is a schematic illustration of an apparatus 50 according to an exemplary embodiment of the invention.

The mechanism shown in FIG. 3 is constituted by a spatially fixed support body 1, a locked or lockable first cogwheel 2 with a number $z_1$ of cogs or teeth, and a drive shaft 3 having an eccentric cross-section 36 and a concentric cross-section 34. The concentric cross-section 34 is guided through the first cogwheel 2. Further, a rotatably mounted cogwheel 4 with a number of cogs or teeth $z_1$ is mounted on the eccentric cross-section 36 of the drive shaft 3. Toothed belt 5 has a number of cogs or teeth $z_2 > z_1$. On the cogwheel 4, any desired shaking shelf board 14 (for instance for lab containers, vials or well plates) can be fastened. Cogwheel 2 is assembled torque proof on the support body 1 (for instance by fixation 6).

Alternatively, it is also possible that the toothing or cogging of the fixed cogwheel 2 is directly integrated in the support body 1. Cogwheel 2 and support body 1 then form a common integral member.

When using a toothed belt 5, its shape always deviates from a circular cross-section ($x \neq y$ in FIG. 5) due to the eccentricity r0. In another embodiment it is also possible that an interior toothed or cogged cogwheel (particularly from plastic material) is used rather than a toothed belt, so that in this scenario it is also possible that the condition $x = y$ applies.

In order to at least partially equilibrate unbalanced masses, it is possible to provide the equilibration mass 7.

As an alternative to the arrangement of toothed belt 5 and cogwheels 2, 4, it is also possible to use two externally toothed and one internally toothed cogwheels, i.e. three cogwheels.

For instance, cogwheel 2 may have z=60 teeth or cogs, and cogwheel 4 may have z=60 teeth or cogs. The toothed belt 5 may for instance have z=62 teeth or cogs. The tooth pitch p may be characterized by p=2 mm, and the eccentricity or the orbital radius r0 may be 2.0 mm (in practice, the value of the eccentricity may vary, for instance may be 1.9 mm or 1.95 mm or 1.85 mm to provide for a slight clearance between the components). For the sake of providing a certain clearance, also for example r0=1.9 mm is possible.

In the scenario FIG. 3, the cogwheel 2 is fixed, and the cogwheel 4 remains orientation fixed during the entire rotation. Toothed belt 5 rotates at each rotation by two teeth or cogs in the rotation direction of the drive shaft 3.

Figure 4:
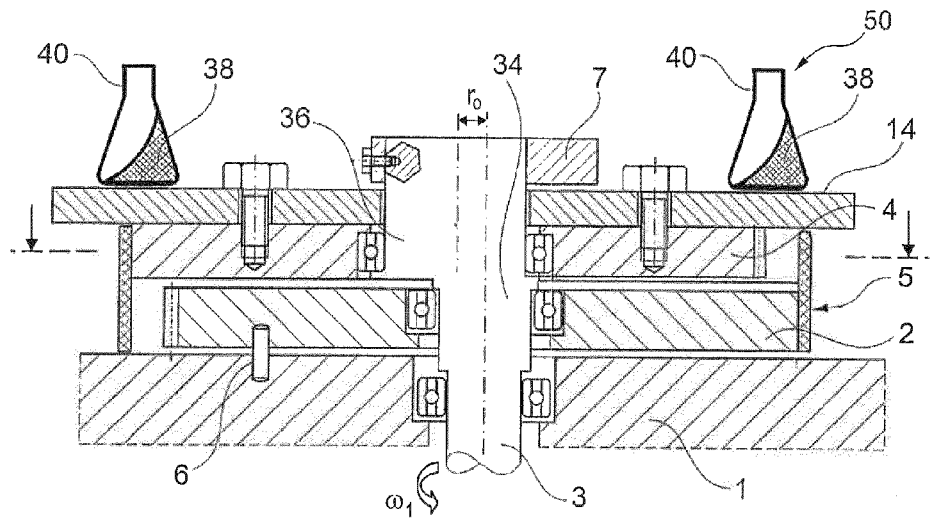
FIG. 4 illustrates part of a sample handling apparatus according to an exemplary embodiment of the invention providing for an orbital motion mode.

FIG. 4 shows a practical realization of an apparatus 50 according to the schematic illustration of FIG. 3.

Figure 5:
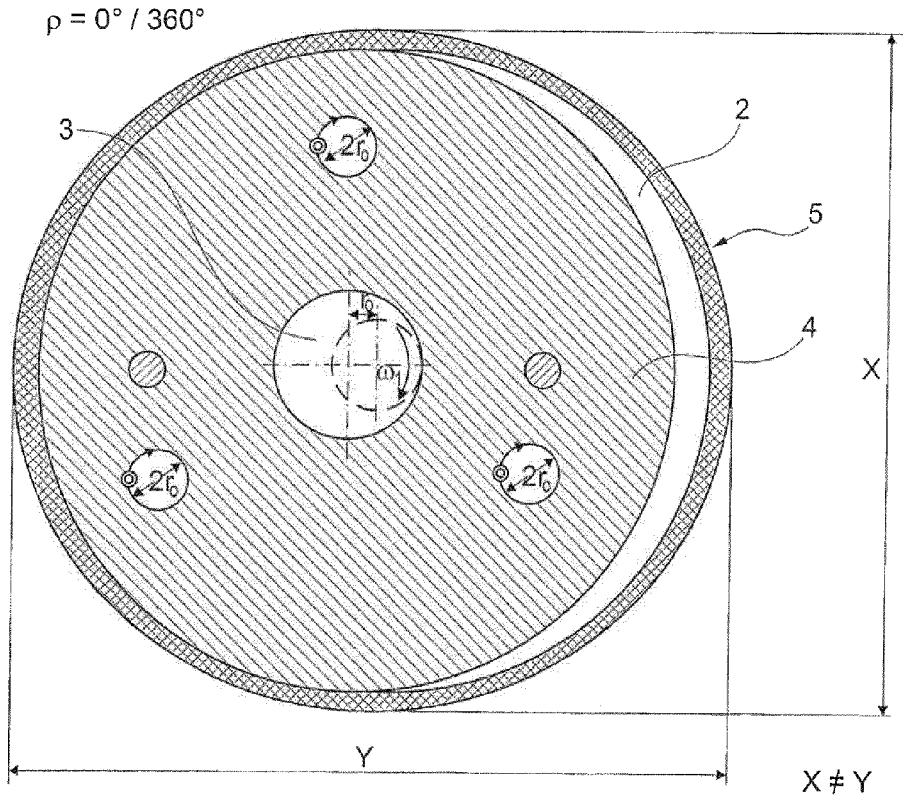
FIG. 5 illustrates cooperation between two cogwheels and a toothed belt according to an exemplary embodiment of the invention. It should be mentioned that the cogs of components are not illustrated in FIG. 5.
Figure 6:
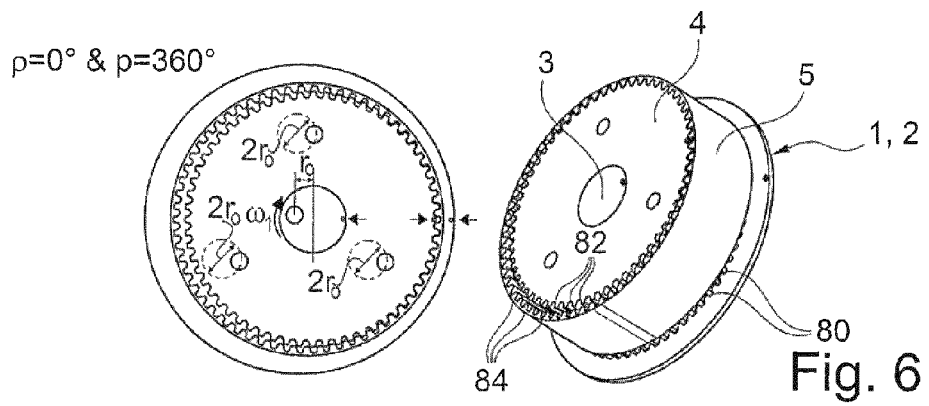
FIG. 6 to FIG. 9 show plan views and cross-sectional views illustrating cooperation between two cogwheels and a toothed belt in different angular states according to an exemplary embodiment of the invention.
Figure 7:
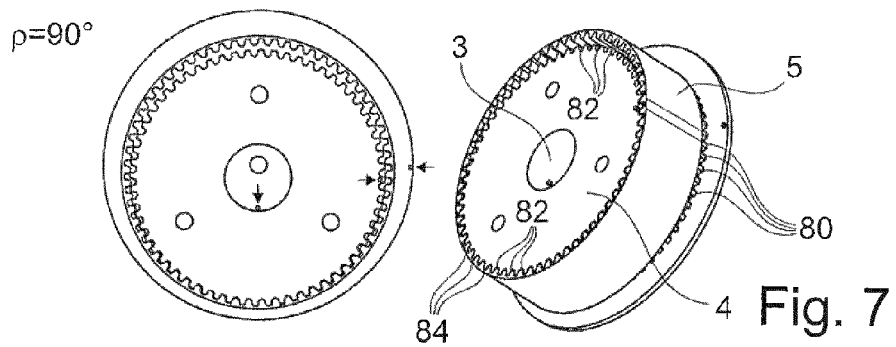
Figure 8:
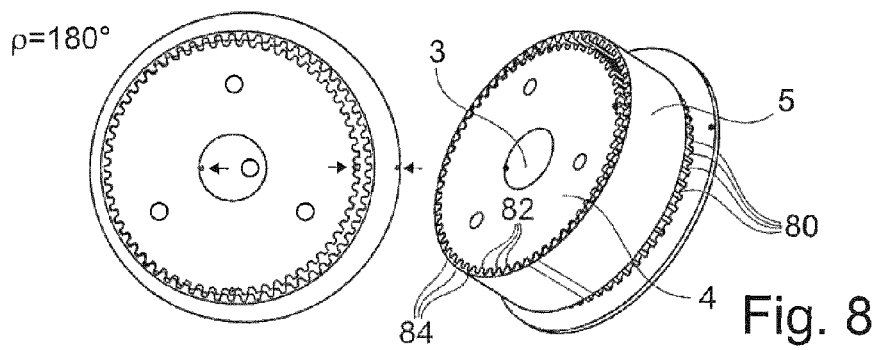
Figure 9:
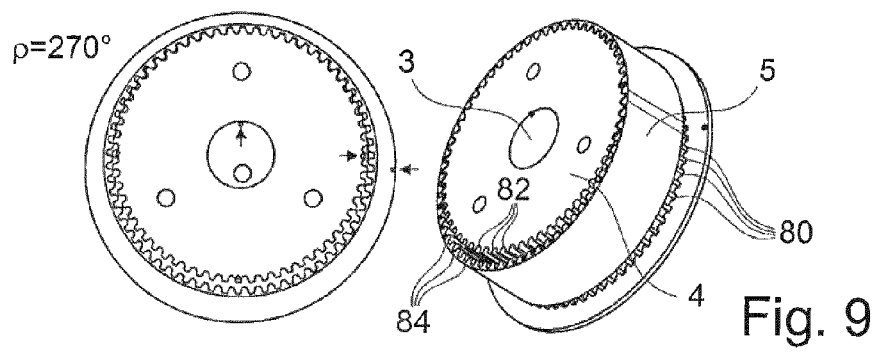

FIG. 5 shows a plan view of the cogwheels 2, 4 and of the toothed belt 5 as well as of the drive shaft 3. It should be mentioned that the cogs of components 2, 4, and 5 are not illustrated in FIG. 5.

FIG. 6 to FIG. 9 shows the relative orientation and cooperation of the cogwheels 2, 4 and the toothed belt 5 during an entire rotation. In this illustration, the spatially fixed support body 1 corresponds to the cogwheel 2. The interaction between the cogs 80, 82 and 84 can be retraced based on FIG. 6 to FIG. 9.

In the following, referring to FIG. 10 to FIG. 16, an apparatus 50 according to an exemplary embodiment of the invention will be explained. This apparatus 50 is compact in size and combines an orbital shaker with a centrifuge, for up to four sample containers (for instance Eppendorf Safelock 2.0 mm).

Apparatus 50 comprises the support body 1, a lid 45 and a rotor 89, see FIG. 10 and FIG. 11. The lid 45 is detachably connectable to the support body 1 by pairs of permanent magnets. Advantageously, it is possible to further increase the safety of the user by a mechanical locking element (for instance a bayonet closure). At the support body 1, a turning knob 91 for a user-defined adjustment of the revolution speed of the apparatus 50 is provided. Each of four accommodation sections 90, 92, 94, 96 is capable of accommodating a respective sample container.

In the following, an operation mode of using the apparatus 50 for an orbital motion (mixture of a fluidic sample) will be explained. The lid 45 is detached from the support body 1, see FIG. 11. In an edge of the support body 1, a Hall switch 93 is provided, see FIG. 12. In another edge, a locking device 95 is provided, which is shifted upwardly by a pair of permanent magnets 97. By this mechanism, disk 99 is connected to the support body 1.

Figure 14:
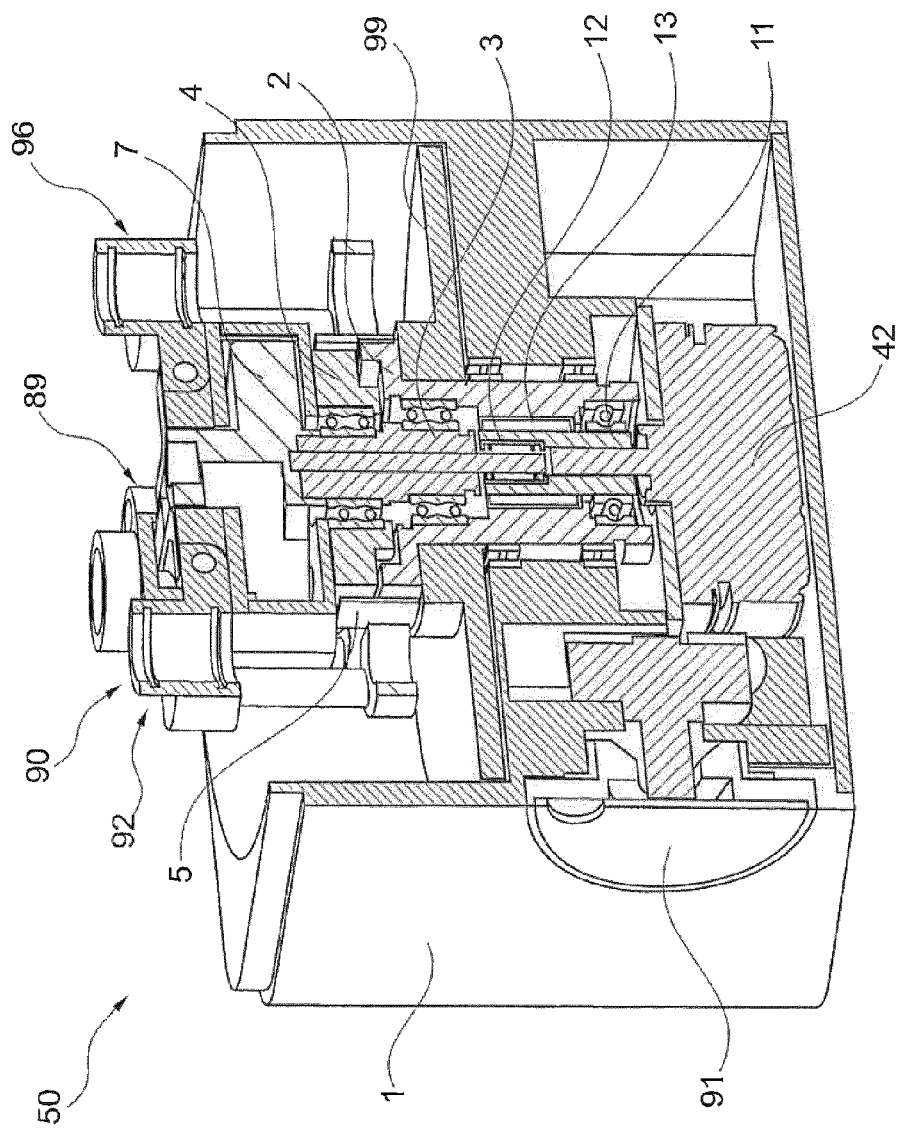
FIG. 14 is a cross-sectional view of the apparatus of FIG. 10 showing an internal constitution thereof.
Figure 16:
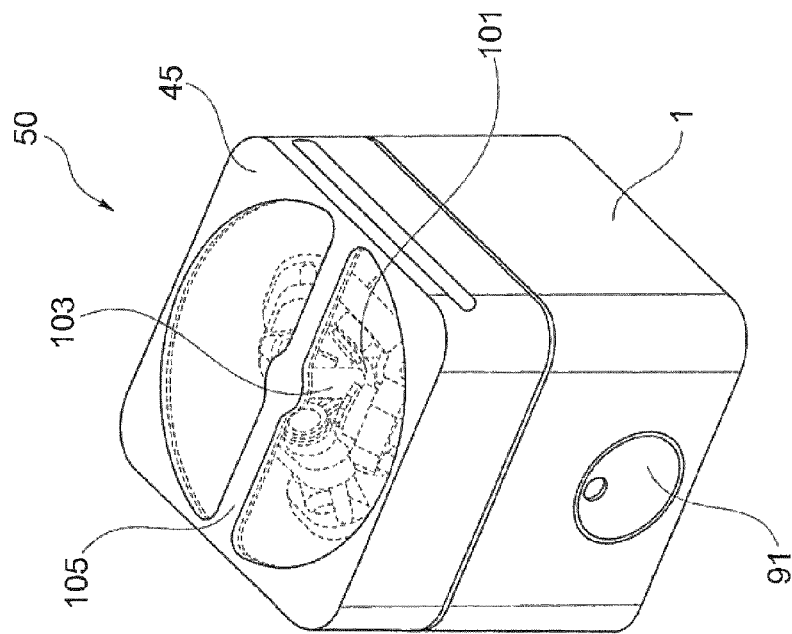
FIG. 16 shows another operation mode of the apparatus of FIG. 10, wherein the accommodation sections are in a pivoted position.

The locked disk 99 is fixedly connected (for instance screwed) with the hollow shaft having toothed belt toothing 4, see FIG. 14. A drive engine 42 rotates in one direction. The hollow shaft 11 which is directly connected to the engine shaft has a one-way clutch 12 which transfers a torque onto the drive shaft 3 in this direction. The drive shaft 3 has a concentric cross-section and an eccentric cross-section. The second one-way clutch 13 which is assembled in the hollow shaft 11 freewheels in this direction and does not transfer torque. By the drive shaft 3, cogwheel 4 fastened via a ball bearing on the eccentric cross-section, as well as the equilibration mass 7 are orbitally elongated, wherein the two cogwheels 2, 4 are always connected via toothed belt 5. At the upper cogwheel 4, the rotor 89 is fastened.

Figures 12, 13:
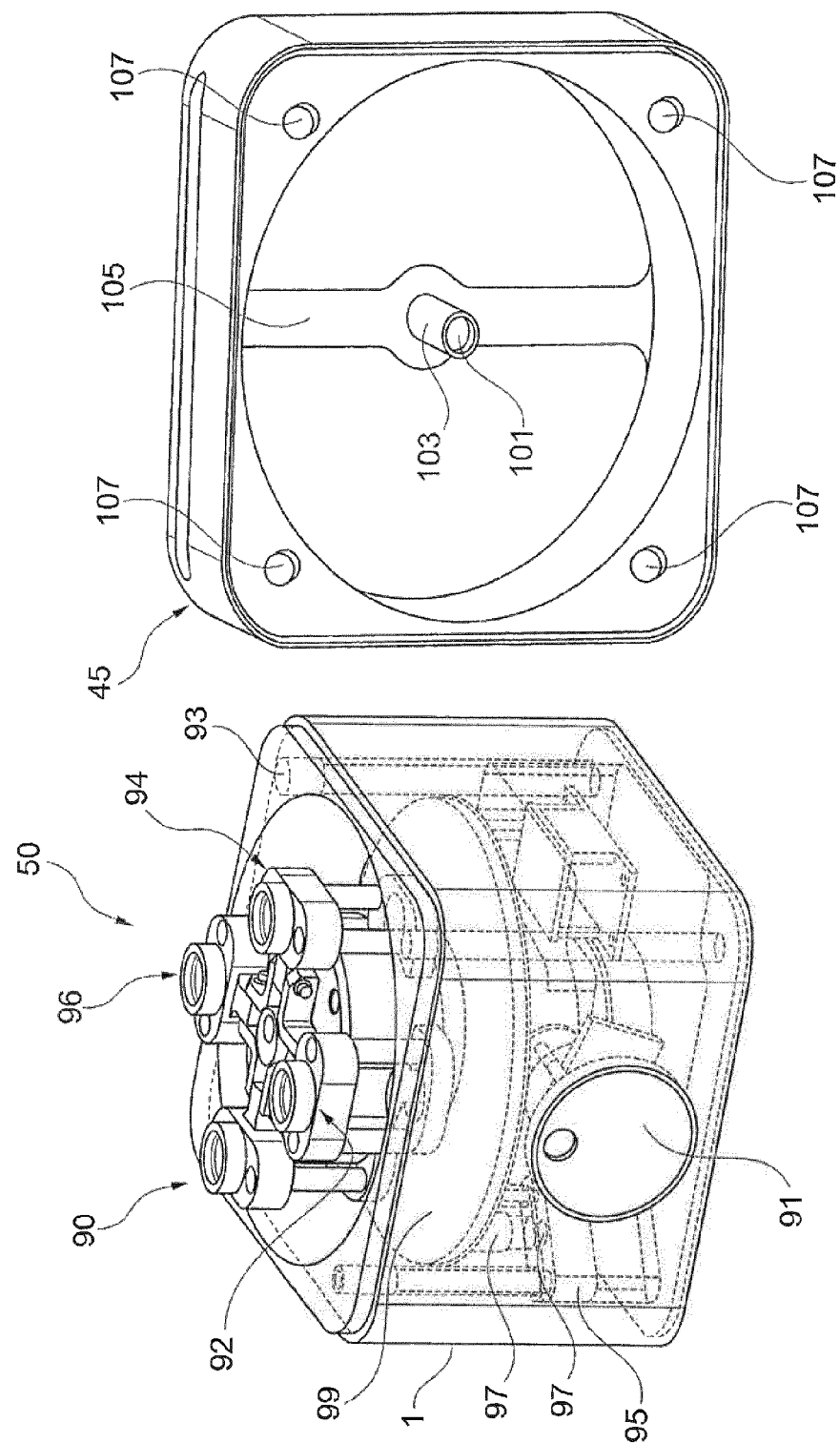
FIG. 12 shows an internal constitution of the apparatus of FIG. 10, wherein a support body is omitted to expose various internal parts.
FIG. 13 shows a detailed view of the lid of the apparatus of FIG. 10.
Figure 15:
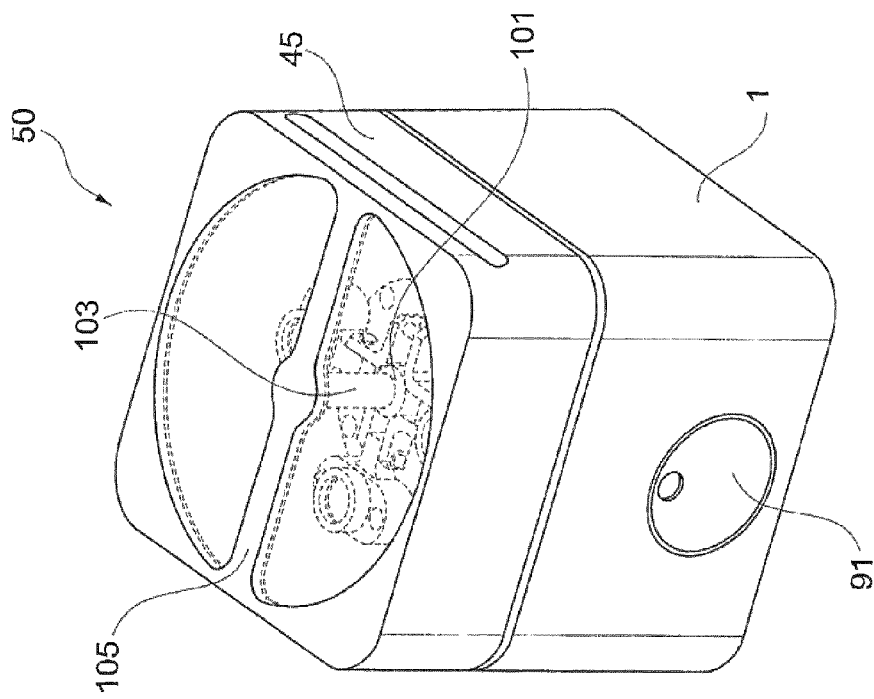
FIG. 15 shows another view of the apparatus of FIG. 10 while the accommodation sections are in an upright position.

For centrifugation, lid 45 is attached to the support body 1, see FIG. 15. One or more permanent magnets 107 integrated in the lid 45 unlock locking device 95 via opposingly (or antiparallel) poled permanent magnets (disk 99 and cogwheel 4 can be rotated with regard to the support body 1), see FIG. 13. Additionally, the equilibration mass 7 and consequently the drive shaft 3 with the eccentric cross-section 36 are connected to the lid 45 and the support body 1 in a torque proof way. As can be seen in FIG. 13 and FIG. 15, a pin 103 protrudes from a top plate 105 of the lid 45 and has an actuator 101 at an end thereof. By means of the actuator 101, a locking of the equilibration mass 7 to the lid 45 may be initiated. Hall switch 93 detects a permanent magnet 107 in the lid 45 and changes the rotation direction of the driving engine 42. Hollow shaft 11 transmits torque via one-way clutch 13 to cogwheel 2. Via the toothed belt 5, the introduced torque is transmitted onto the cogwheel 4 and hence to the rotor 89. One-way clutch 12 freewheels in this direction, i.e. no torque is transmitted to drive shaft 3. Rotor 89 rotates itself and the sample containers therein around its symmetry axis, whereby a centrifugation is started, see FIG. 16.

Figure 17:
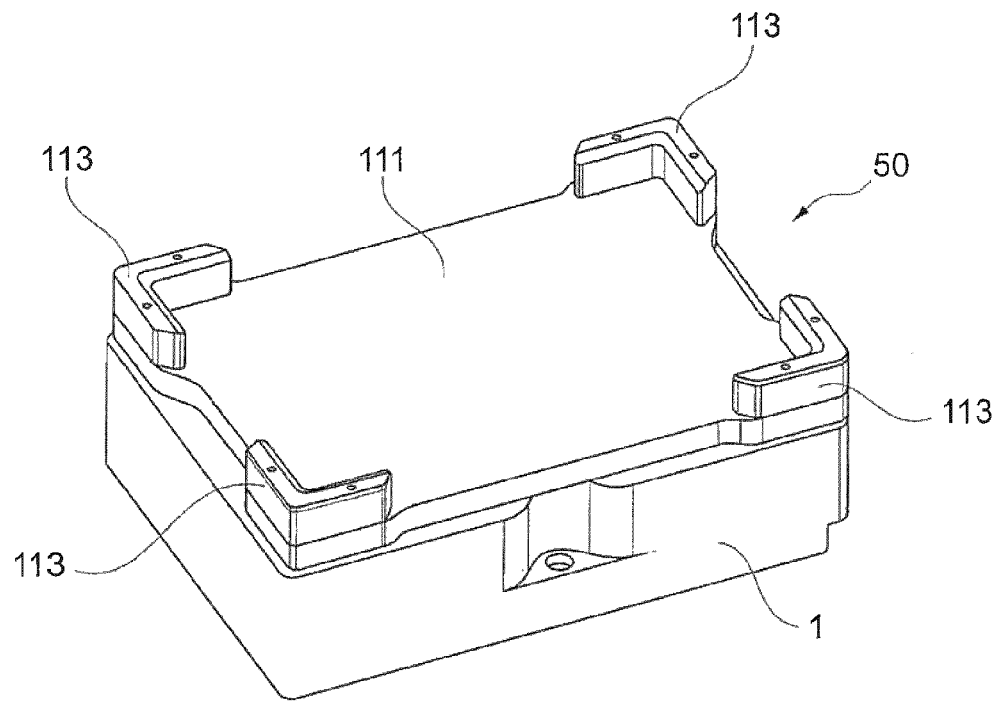
FIG. 17 shows a sample handling apparatus according to an exemplary embodiment of the invention in which well plates are selectively shaken or centrifuged.

FIG. 17 shows an apparatus 50 according to another exemplary embodiment of the invention in which the sample holder is realized by a plate 111 having positioning edges 113 in each of the edges of the apparatus 50 for clampingly engaging a well plate (not shown in FIG. 17) carrying various fluidic samples under examination.

Figure 18:
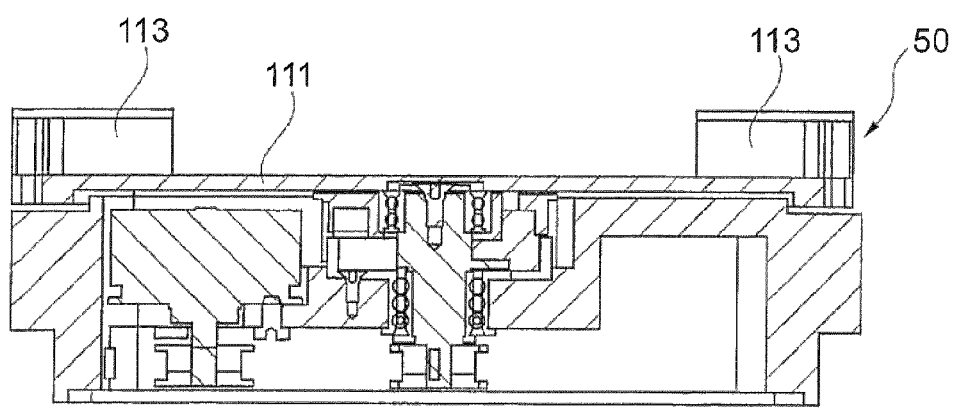
FIG. 18 is a cross-sectional view of the apparatus of FIG. 17 illustrating the internal construction thereof.

FIG. 18 shows a cross-section of the internal constitution of apparatus 50 of FIG. 17. The principles as shown and described above referring to FIG. 1 to FIG. 16 can be implemented here as well.

Figure 19:
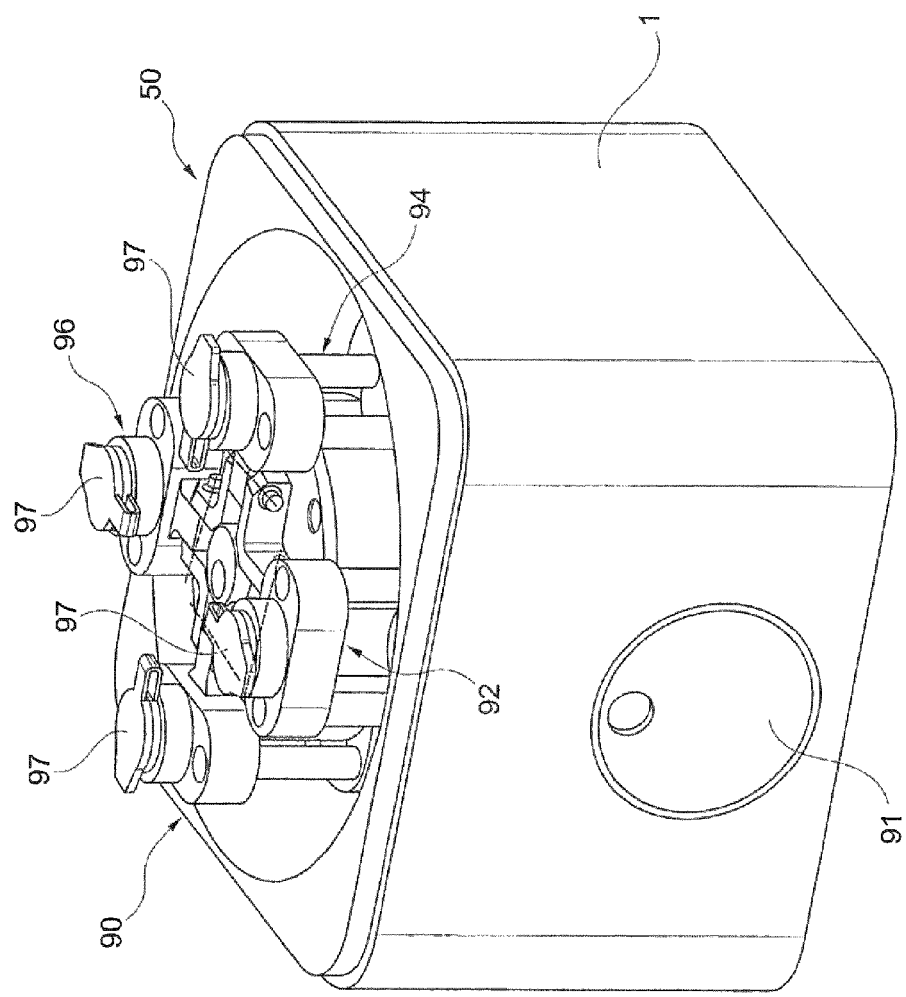
FIG. 19 is a three-dimensional view of an apparatus according to an exemplary embodiment of the invention with the removed lid.
Figure 20:
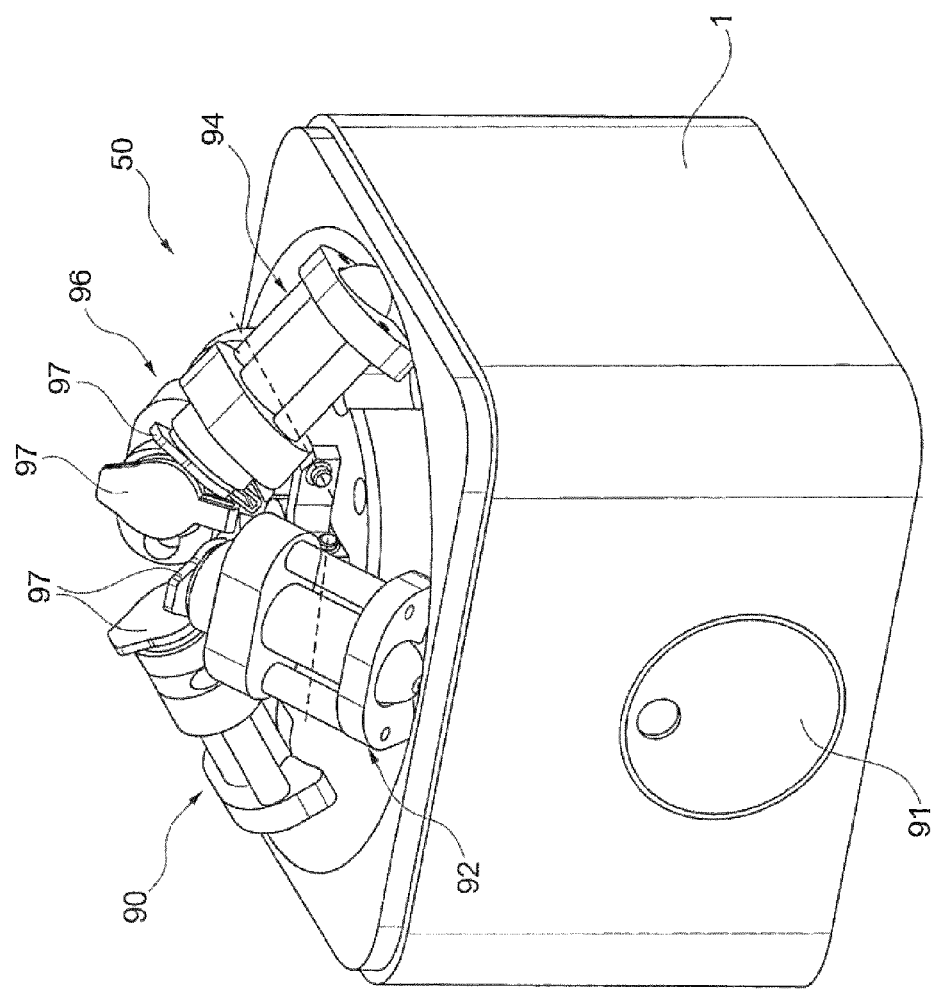
FIG. 20 shows the apparatus of FIG. 19 in an operation mode in which the accommodation sections are pivoted in response to an applied rotational force.

FIG. 19 and FIG. 20 show a further feature of an apparatus 50 according to an exemplary embodiment of the invention. As can be taken from dashed lines in FIG. 19 and FIG. 20, the (in this case four) accommodation sections 90, 92, 94, 96 are mounted to be pivotable around a pivoting axis (dashed sections) which are perpendicular to a vertical rotation axis of the orbital motion and of the rotary motion so as to be pivoted upon exceeding a predefined rotation force. As shown in FIG. 19, when the rotation of the rotor 89 is slow or the mechanism is in orbital motion mode, the centrifugal force acting on the accommodation sections 90, 92, 94, 96 is small as well. However, upon exceeding a predefined threshold value of the centrifugal force, the accommodation sections 90, 92, 94, 96 will move upwardly as shown in FIG. 20 so that the centrifugation can be performed efficiently. Thus, the accommodation sections 90, 92, 94, 96 are foldable and tilt upon exceeding a certain centrifugal force. Optionally, permanent magnets or other biasing force elements may be provided which tend to keep the accommodation sections 90, 92, 94, 96 in the position of FIG. 19 in orbital motion mode.

The vertical alignment of the accommodation sections 90, 92, 94, 96 may be maintained in the orbital motion mode by permanent magnets or resetting elements. In an embodiment, the accommodation sections 90, 92, 94, 96 do not pivot upon mixing, but only upon centrifuging (with a sufficiently high centrifuging force).

Figure 21:
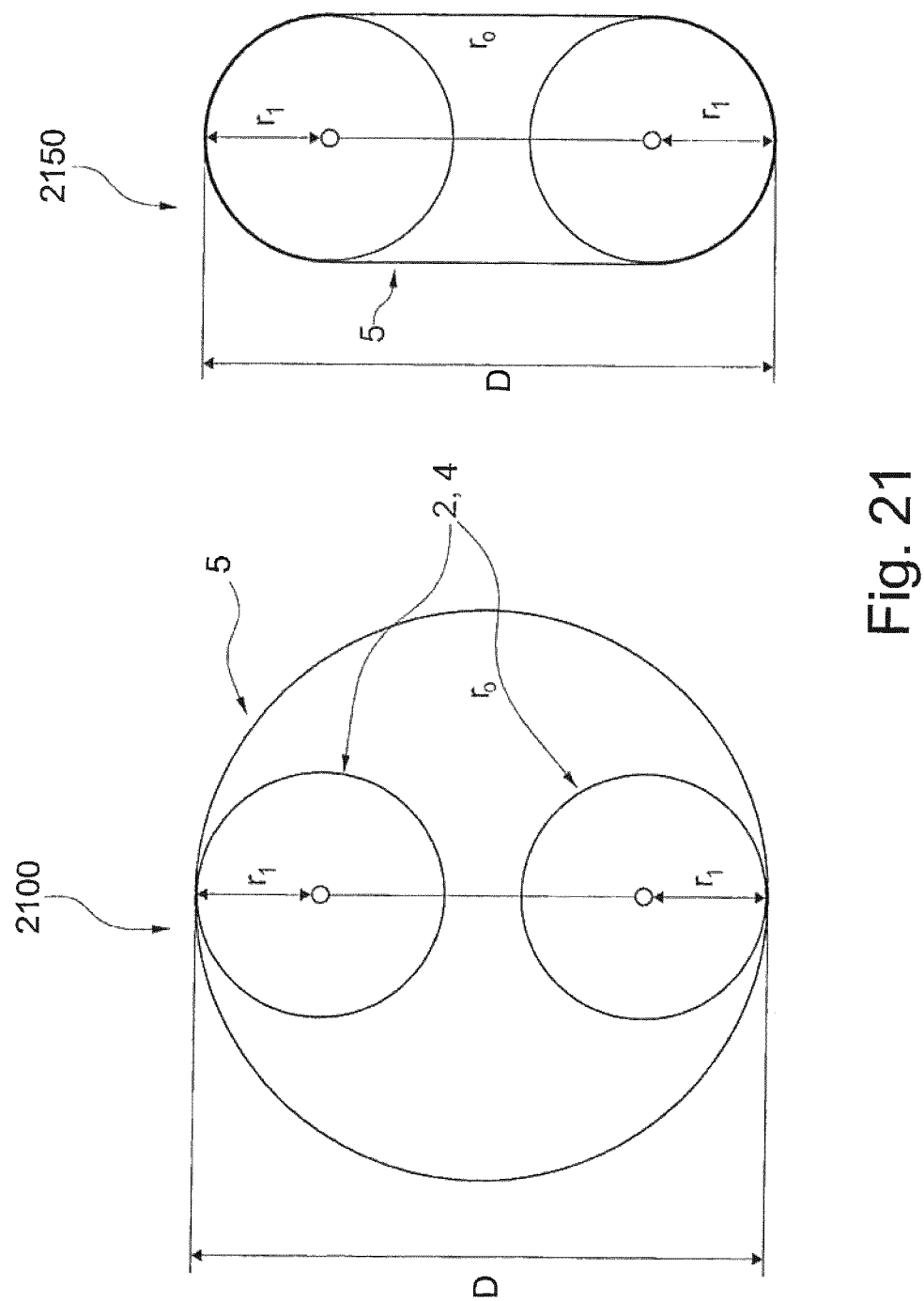
FIG. 21 shows geometrical conditions in a section of a device according to an exemplary embodiment of the invention in which a rigid or a deformable coupling body interacts with two cogwheels.

FIG. 21 shows geometrical conditions in a section of a device according to an exemplary embodiment of the invention in which a rigid coupling body 5 (see left hand side) or a deformable coupling body 5 (see right hand side) interacts with two cogwheels 2, 4.

If the coupling body 5 is a rigid structure (such as an internally toothed pinion or gearwheel) the scenario 2100 is obtained.

If the coupling body 5 is a deformable structure (such as a toothed belt) the scenario 2150 is obtained.

The inner diameter D (or more precisely the largest inner extension) of the coupling body 5 is larger, by the eccentricity $r_0$, than twice of the radius $r_1$ of the cogwheels 2, 4:

$$D = r_1 + r_1 + r_0 = d_1 + r_0$$

Figure 22:
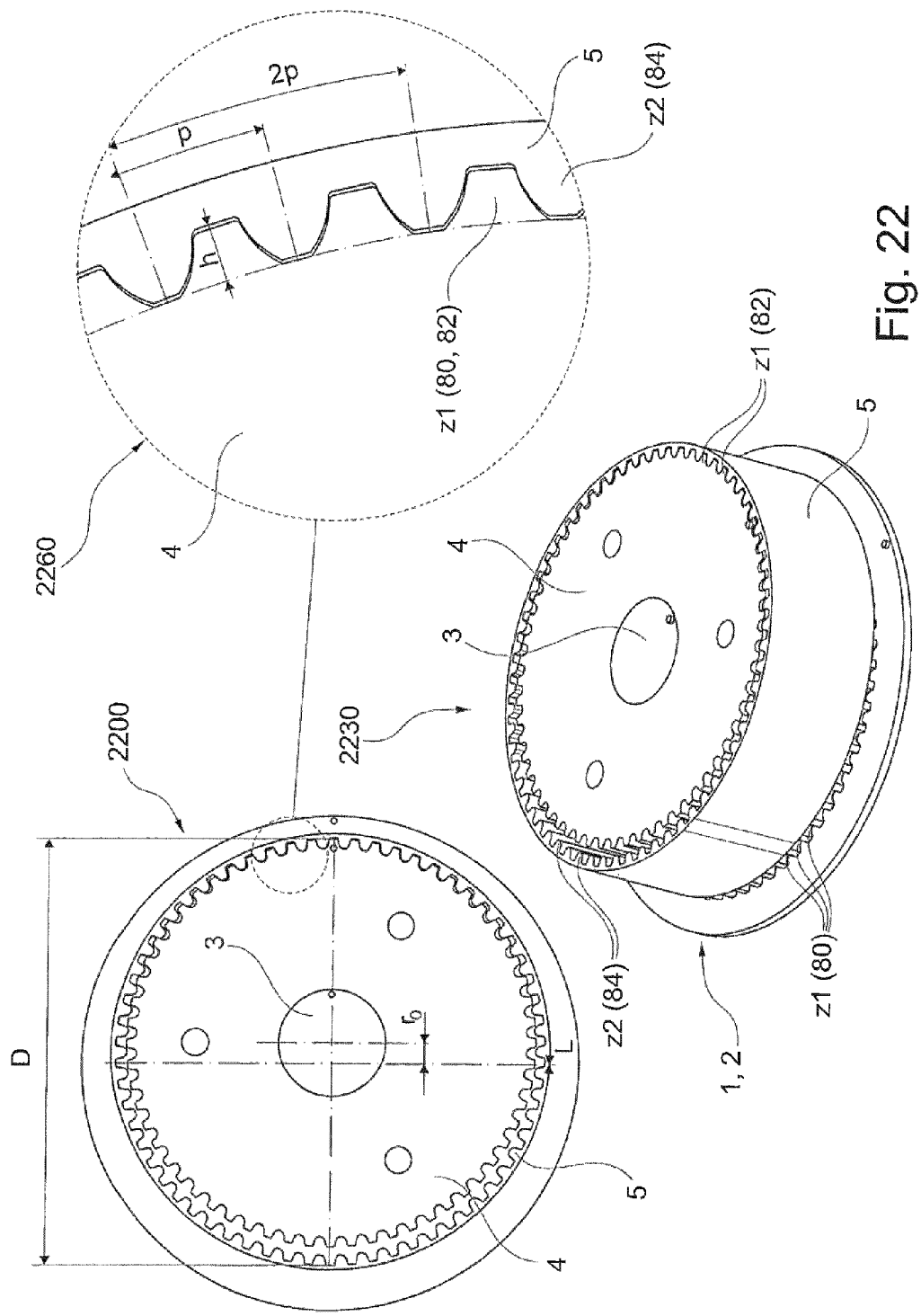
FIG. 22 shows a plan view, a three-dimensional view and a detail of a mechanism illustrating an interaction between a coupling body and two cogwheels according to an exemplary embodiment of the invention.

FIG. 22 shows a plan view 2200, a three-dimensional view 2230 and a detail 2260 of a mechanism illustrating an interaction between coupling body 5 and two cogwheels 2, 4 according to an exemplary embodiment of the invention.

For a proper orbital motion, the following conditions should be fulfilled:

a) Inner diameter D (in case of a rigid coupling body 5) or largest extension (in case of a deformable coupling body 5) of the coupling body 5 should ideally be the sum of the outer diameter of one of the cogwheels 2, 4 ($d_1 = r_1 + r_1$) plus the eccentricity $r_0$, i.e. $D = r_1 + r_1 + r_0 = d_1 + r_0$.

b) The number $z_2$ of teeth of the coupling body 5 should be larger, by at least one tooth, than the number $z_1$ of teeth of the cogwheels 2, 4: $z_2 \geq z_1 + 1$ c) The eccentricity $r_0$ should be larger than the height h of the teeth (in order to enable a decoupling of the teeth from the coupling body 5): $r_0 > h$ d) The eccentricity $r_0$ should be selected so that the number $z_2$ of teeth of the coupling body 5 is integer (plus some clearance, as the skilled person will understand): $r_0 = (L - z_1 * p)/2$, wherein $L = z_2 * p$ is the circumferential length of the coupling body 5 and p is the tooth pitch.

Figure 23:
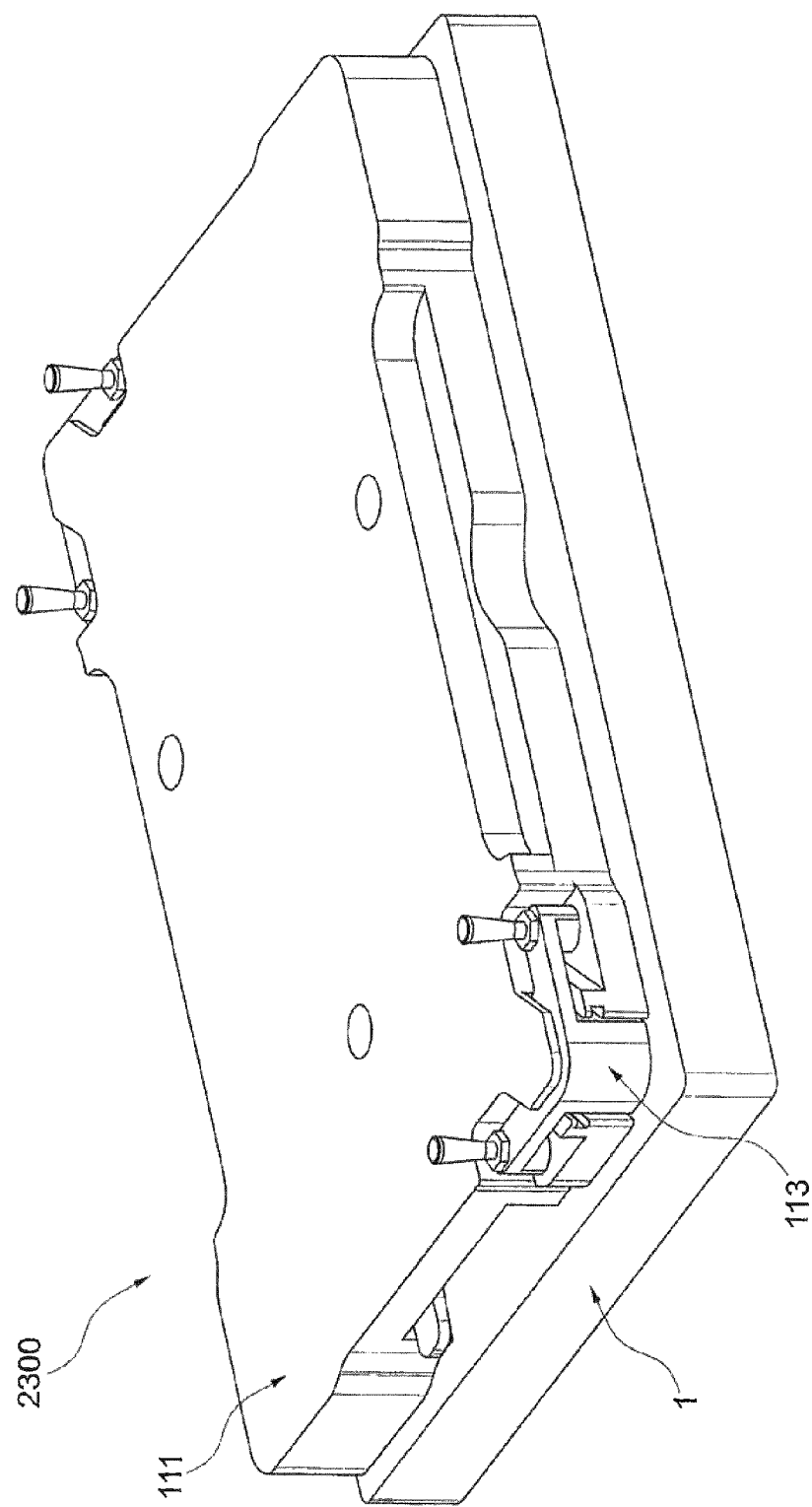
FIG. 23 and FIG. 24 show a sample handling apparatus according to an exemplary embodiment of the invention in which well plates can be shaken.
Figure 24:
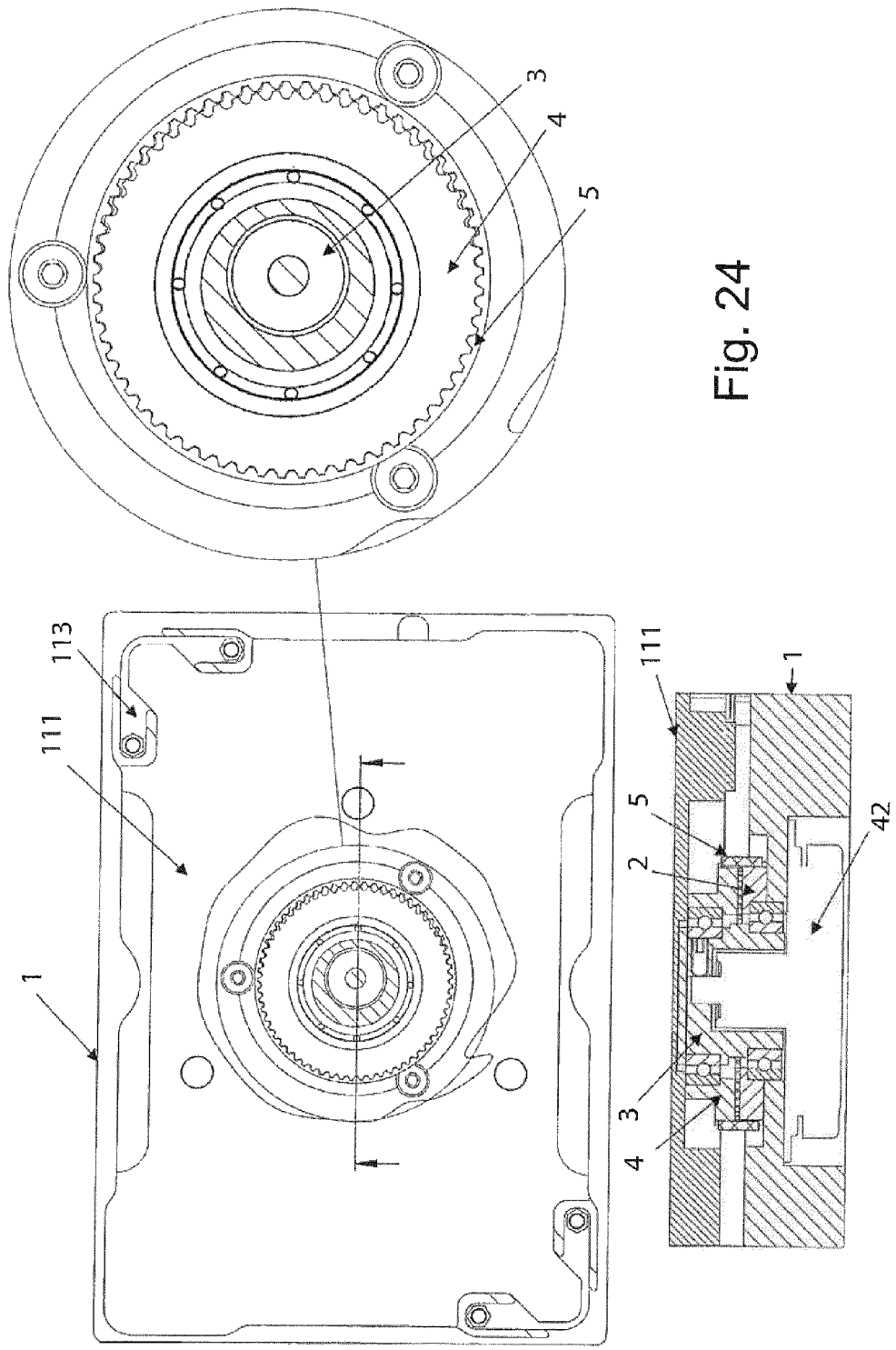

FIG. 23 shows a plan view and FIG. 24 shows detailed views of a sample handling apparatus 2300 according to an exemplary embodiment of the invention in which well plates (not shown) can be shaken.

The functionality of the sample handling apparatus 2300 equals to that of the embodiment of FIG. 17, i.e. it is an orbital shaker with a flat construction for handling well plates. The shown embodiment has implemented the function "shaking by orbital motion". In contrast to the embodiment of FIG. 17, the embodiment of FIG. 23 has a direct driving mechanism for drive shaft 3, wherein FIG. 17 and FIG. 18 implement an indirect drive. Additionally, the positioning edges 113 have an edge locking mechanism (of the type as disclosed in WO 2011/113858). In this embodiment, a compensation weight 7 (not shown) can be advantageously attached on drive shaft 3.

Figure 25:
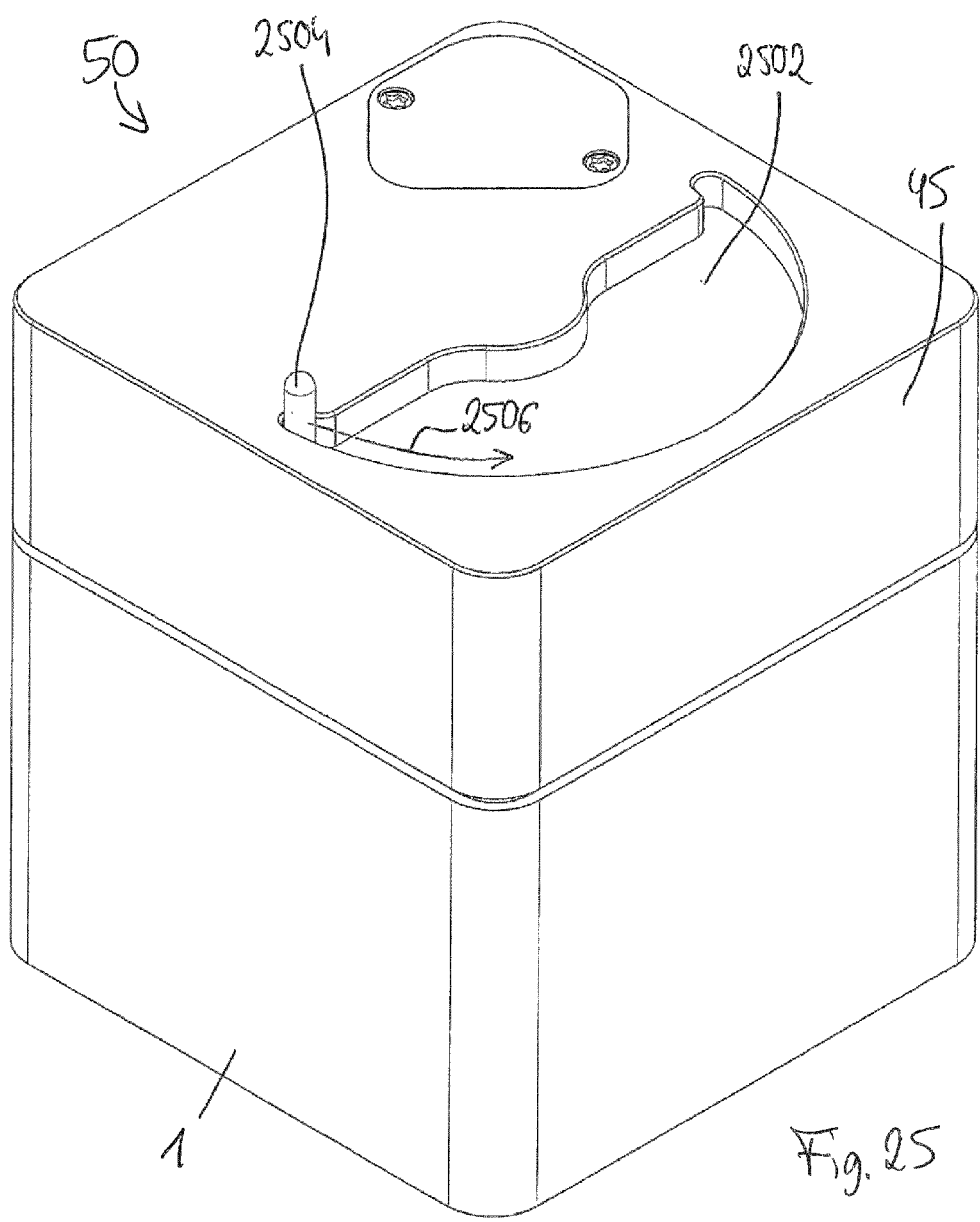
FIG. 25 shows a three-dimensional view of a sample handling apparatus according to another exemplary embodiment of the invention.

FIG. 25 shows a three-dimensional view of a sample handling apparatus 50 according to another exemplary embodiment of the invention. Construction of the sample handling apparatus 50 is similar to FIG. 10. The sample handling apparatus 50 has a support body 1 and a removable lid 45. However, the lid has a recess in a top surface thereof which is selectively closable openable by moving a slidable plate 2502. In the shown configuration, plate 2502 covers the recess in lid 45 so that the lid 45 is in a closed state. By operating an actuation pin 2504 along a rotation trajectory 2506, the plate 2502 is slid below the outer surface of the lid 45, thereby exposing an interior of the sample handling apparatus 50 to an external environment. This also allows to handle sample containers in accommodation sections 90, 92, 94, 96.

FIG. 26 shows a three dimensional cross-sectional view of the sample handling apparatus 50 of FIG. 25 together with two details 2620, 2640 illustrating certain features thereof. FIG. 27 shows a corresponding planar cross-sectional view of the sample handling apparatus 50 together with two details 2720, 2740 illustrating certain features thereof.

In the following, reference is made to the differences of the embodiment of FIG. 26 and FIG. 27 as compared to the embodiments described above. In the embodiment of FIG. 26 and FIG. 27, a shaft locking element 10 is omitted. In contrast to this, the sample handling apparatus 50 further comprises a locking one-way clutch 2602 configured for coupling drive shaft 3 of the orbital motion generator 2 to 5 with lid 45 on support body 1 so as to selectively lock the drive shaft 3 with the lid 45 on the support body 1 to a locked stationarily mounted state when the gear element 11 is driven in direction B (compare FIG. 1), or to freewheel in an unlocked movably mounted state of the drive shaft 3 when the gear element 11 is driven in the other direction A.

As in the above embodiments, the second one-way clutch 13 is arranged to circumferentially surround the first one-way clutch 12. The first one-way clutch 12 and the second one-way clutch 13 are arranged concentrically around a rotation axis of drive shaft 3 of the orbital motion generator 2 to 5. The first one-way clutch 12 and the second one-way clutch 13 are arranged at overlapping height ranges in relation to the rotation axis of the drive shaft 3 of the orbital motion generator 2 to 5. As in the previously described embodiments, the gear element 11 comprises a hollow shaft being located between the first one-way clutch 12 and the second one-way clutch 13 so as to surround the first one-way clutch 12 and to be surrounded by the second one-way clutch 13.

Also in FIG. 25 to FIG. 27, the mechanism comprises cooperating cogwheels 2, 4 forming part of both the orbital motion generator 2 to 5 and the rotary motion generator 2, 4, 5. Drive shaft 3 which is to be coupled to the gear element 11 via the one-way clutch 12 forms part of the orbital motion generator 2 to 5, but not of the rotary motion generator 2, 4, 5.

In contrast to the previously described embodiments, the FIG. 26 and FIG. 27 embodiment omits shaft locking element and implements instead of this a third one-way clutch, i.e. locking one-way clutch 2602. The outer ring of the locking one-way clutch 2602 is connected to the stator housing (here lid 45, alternatively support body 1) of the sample handling apparatus 50 in a rotatably fixed or torque-proof way. Clamping elements of the locking one-way clutch 2602 run on drive shaft 3. By the locking one-way clutch 2602, rotation of the drive shaft 3 is disabled in one direction and is enabled in the opposite direction. In order to enable the locking one-way clutch 2602 to fulfil the function of the shaft locking element 10, locking one-way clutch 2602 freewheels in the same direction as the second one-way clutch 13 and freewheels in the opposite direction than the first one-way clutch 12. An advantage of the shown embodiment in contrast to the provision of shaft locking element 10 is that an automatic (i.e. without the need of an active control) locking and unlocking of the drive shaft 3 with regard to the stator housing is made possible with simple means.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A mechanism for switching a sample holder for accommodating a fluidic sample between an orbital motion mode for sample mixing and a rotary motion mode for sample separation, the mechanism comprising:
    a gear element being drivable by a drive unit to move selectively in a first direction or in a second direction being inverse to the first direction;
    an orbital motion generator configured for generating an orbital motion of the sample holder when being operated in the orbital motion mode;
    a rotary motion generator configured for generating a rotary motion of the sample holder when being operated in the rotary motion mode; and
    a one-way clutch arrangement configured for selectively:
        coupling the gear element with the orbital motion generator to transfer a driving force from the gear element to the orbital motion generator for generating the orbital motion when the gear element is driven in the first direction and to freewheel when the gear element is driven in the second direction; or
        coupling the gear element with the rotary motion generator to transfer a driving force from the gear element to the rotary motion generator for generating the rotary motion when the gear element is driven in the second direction and to freewheel when the gear element is driven in the first direction.

2. The mechanism according to claim 1, wherein the one-way clutch arrangement comprises:
    a first one-way clutch configured for coupling the gear element with the orbital motion generator to transfer the driving force from the gear element to the orbital motion generator for generating the orbital motion when the gear element is driven in the first direction and to freewheel when the gear element is driven in the second direction; and
    a second one-way clutch configured for coupling the gear element with the rotary motion generator to transfer the driving force from the gear element to the rotary motion generator for generating the rotary motion when the gear element is driven in the second direction and to freewheel when the gear element is driven in the first direction.

3. The mechanism according to claim 2, wherein the first one-way clutch and the second one-way clutch freewheel in mutually opposite directions and transmit force in mutually opposite directions.

4. The mechanism according to claim 2, wherein the first one-way clutch is arranged between an interior curved surface of the gear element configured as a hollow shaft and an exterior curved surface of a drive shaft of the orbital motion generator.

5. The mechanism according to claim 2, wherein the second one-way clutch is arranged between an exterior curved surface of the gear element configured as a hollow shaft and an interior curved surface of a movably mounted cogwheel of the rotary motion generator.

6. The mechanism according to claim 1, wherein the rotary motion generator comprises:
   a selectively lockable first cogwheel in an unlocked movably mounted state, coupled to the gear element via the one-way clutch arrangement and having a plurality of first cogs arranged along an outer circumference of the first cogwheel;
   a movably mounted second cogwheel having a plurality of second cogs arranged along an outer circumference of the second cogwheel; and
   a coupling body having a plurality of third cogs arranged along an inner circumference of the coupling body,
   wherein the coupling body is mounted with the first cogwheel and with the second cogwheel to engage part of the first cogs and part of the second cogs by part of the third cogs to thereby generate the rotary motion of the second cogwheel and a sample holder to be mounted so as to follow a motion of the second cogwheel upon rotating the gear element in the second direction.

7. The mechanism according to claim 6, wherein the orbital motion generator comprises:
   the selectively lockable first cogwheel in a locked stationarily mounted state and having a first through hole;
   the second cogwheel having a second through hole; and
   a drive shaft coupled to the gear element via the one-way clutch arrangement and having a concentric first section and an eccentric second section, wherein the first section is guided through the first through hole and the second section is guided through the second through hole,
   wherein the coupling body is mounted with the first cogwheel and with the second cogwheel to engage part of the first cogs and part of the second cogs by part of the third cogs to thereby generate the orbital motion of the second cogwheel and a sample holder to be mounted so as to follow a motion of the second cogwheel upon rotating the gear element in the first direction.

8. The mechanism according to claim 6, further comprising a cogwheel locking element configured for selectively locking the first cogwheel in the locked stationarily mounted state or for unlocking the first cogwheel in the unlocked movably mounted state.

9. The mechanism according to claim 7, further comprising a shaft locking element configured for selectively locking the drive shaft in a locked stationarily mounted state, or for unlocking the drive shaft in an unlocked movably mounted state.

10. The mechanism according to claim 1, comprising a support body accommodating the components of the mechanism and comprising a lid to be attached onto the support body, wherein the support body and the lid are configured correspondingly to one another so that upon attaching the lid onto the support body, the mechanism is triggered to be switched from the orbital motion mode to the rotary motion mode.

11. The mechanism according to claim 6, wherein each of the first cogwheel and the second cogwheel is a toothed belt disc and the coupling body is a toothed belt.

12. The mechanism according to claim 6, wherein each of the first cogwheel and the second cogwheel is a sprocket and the coupling body is a sprocket chain.

13. The mechanism according to claim 7, wherein the coupling body is a flexible structure being deformable but non-elongatable upon rotating the drive shaft so as to adapt its shape to follow motion of the second cogwheel while maintaining the coupling between the first cogwheel and the second cogwheel.

14. The mechanism according to claim 7, wherein the coupling body is a rigid, non-deformable structure which, upon rotating the drive shaft, follows, as a whole, motion of the second cogwheel while maintaining the coupling between the first cogwheel and the second cogwheel.

15. The mechanism according to claim 6, wherein the coupling body is an annular structure having an inner diameter which is larger than an outer diameter of the first cogwheel and the second cogwheel.

16. The mechanism according to claim 7, wherein, in the orbital motion mode, the coupling body is mounted with the first cogwheel and with the second cogwheel so as to form a form closure which superposes, to a rotating motion of the second cogwheel transmitted by the drive shaft, a rolling motion of the second cogwheel during which the second cogwheel rolls up on the coupling body limited by a rolling motion during which the coupling body rolls up on the first cogwheel.

17. The mechanism according to claim 1, comprising a drive unit being configured for moving the gear element.

18. The mechanism according to claim 7, comprising a compensation weight mounted asymmetrically on the drive shaft and being configured so as to at least partially compensate for a mechanical load acting on the drive shaft upon generating the orbital motion.

19. The mechanism according to claim 1, further comprising a locking oneway clutch configured for coupling a drive shaft of the orbital motion generator with a stationary housing so as to selectively lock the drive shaft with the stationary housing to a locked stationarily mounted state when the gear element is driven in one direction, or to freewheel in an unlocked movably mounted state of the drive shaft when the gear element is driven in another direction, wherein the one direction equals to the second direction and the other direction equals to the first direction.

20. The mechanism according to claim 19, wherein the stationary housing comprises a lid detachably connectable to and/or pivotably mounted on a spatially fixed support body of the stationary housing, wherein the locking one-way clutch is configured for coupling the drive shaft with the lid.

21. The mechanism according to claim 1, further comprising a locking element configured for selectively locking a drive shaft of the orbital motion generator in a locked stationarily mounted state, or for unlocking the drive shaft in an unlocked movably mounted state.

22. The mechanism according to claim 2, wherein the second one-way clutch is arranged to circumferentially surround the first one-way clutch, wherein the first one-way clutch and the second one-way clutch are arranged concentrically around a rotation axis of the mechanism, and wherein the first one-way clutch and the second one-way clutch are arranged in at least overlapping height ranges in relation to a rotation axis of the mechanism.

23. The mechanism according to claim 1, wherein the one-way clutch arrangement is mounted so as to be immovable along a rotation axis of the mechanism.

24. The mechanism according to claim 2, wherein the gear element comprises a hollow shaft being located between the first one-way clutch and the second one-way clutch so as to circumferentially surround the first one-way clutch and to be circumferentially surrounded by the second one-way clutch.

25. The mechanism according to claim 1, wherein the orbital motion generator comprises a drive shaft having an eccentric section being eccentric with regard to a rotation axis around which the gear element is rotatable driven by the drive unit, wherein the eccentric section extends through the sample holder.

26. The mechanism according to claim 25, wherein the drive shaft has a concentric section being concentric with regard to the rotation axis, wherein at least a part of the concentric section, but not the eccentric section, is surrounded by at least a part of the one-way clutch arrangement.

27. The mechanism according to claim 1, comprising cooperating cogwheels forming part of both the orbital motion generator and the rotary motion generator.

28. The mechanism according to claim 1, comprising a drive shaft to be coupled to the gear element via the one-way clutch arrangement and forming part of the orbital motion generator, but not of the rotary motion generator.

29. An apparatus for selectively operating a sample holder for accommodating a fluidic sample in an orbital motion mode for sample mixing, or in a rotary motion mode for sample separation, the apparatus comprising:
the mechanism according to claim 1 for switching the sample holder between the orbital motion mode and the rotary motion mode; and
the sample holder for accommodating the fluidic sample and being coupled to the mechanism.

30. The mechanism according to claim 1, wherein sample mixing comprises shaking.

31. The mechanism according to claim 1, wherein the sample separation comprises centrifuging.

32. The mechanism according to claim 1, wherein the gear element is drivable by a drive unit to rotate.

33. The mechanism according to claim 9, wherein the shaft locking element is configured for selectively locking the drive shaft in the locked stationarily mounted state in the rotary motion mode, or for unlocking the drive shaft in the unlocked movably mounted state in the orbital motion mode.

34. The mechanism according to claim 10, wherein the mechanism is triggered by a lid attaching sensor configured for sensing attachment of the lid onto the support body.

35. The mechanism according to claim 15, wherein the inner diameter of the annular structure is one times of an eccentricity (r0) of the second section of the drive shaft larger than an outer diameter of the first cogwheel and the second cogwheel.

36. The mechanism according to claim 35, wherein a largest inner extension of the coupling body equals to an outer diameter of the first cogwheel or the second cogwheel plus the eccentricity (r0) of the second section of the drive shaft.

37. The mechanism according to claim 17, wherein the drive unit comprises an electric motor.

38. The mechanism according to claim 17, wherein the drive unit is configured for rotating the gear element.

39. The mechanism according to claim 19, wherein the drive shaft comprises an eccentric drive shaft.

40. The mechanism according to claim 21, wherein the locking element is configured for selectively locking the drive shaft of the orbital motion generator in the locked stationarily mounted state in the rotary motion mode, or for unlocking the drive shaft in the unlocked movably mounted state in the orbital motion mode.

41. The mechanism according to claim 22, wherein the rotation axis of the mechanism comprises a rotation axis of a drive shaft of the orbital motion generator.

42. The mechanism according to claim 22, wherein the first one-way clutch and the second one-way clutch are arranged in at least overlapping height ranges that extend over the same height range.

43. The mechanism according to claim 22, wherein the rotation axis of the mechanism comprises a rotation axis of a drive shaft of the orbital motion generator, and wherein the first one-way clutch and the second one-way clutch are arranged in at least overlapping height ranges in relation to the rotation axis of the drive shaft of the orbital motion generator.

44. The mechanism according to claim 23, wherein the rotation axis of the mechanism comprises a rotation axis of a drive shaft of the orbital motion generator.

45. The mechanism according to claim 25, wherein the eccentric section extends through a recessed sample holder plate of the sample holder.

46. The apparatus according to claim 29, wherein the sample mixing comprises shaking.

47. The apparatus according to claim 29, wherein the sample separation comprises centrifuging.

48. A method of switching a sample holder accommodating a fluidic sample between an orbital motion mode for sample mixing, and a rotary motion mode for sample separation, the method comprising:
driving a gear element to move selectively in a first direction or in a second direction being inverse to the first direction;
operating a one-way clutch arrangement for selectively:
coupling the gear element with an orbital motion generator to transfer a driving force from the gear element to the orbital motion generator for generating the orbital motion when the gear element is driven in the first direction and to freewheel when the gear element is driven in the second direction; or
coupling the gear element with a rotary motion generator to transfer a driving force from the gear element to the rotary motion generator for generating the rotary motion when the gear element is driven in the second direction and to freewheel when the gear element is driven in the first direction.

49. The method according to claim 48, wherein the sample mixing comprises shaking.

50. The method according to claim 48, wherein the sample separation comprises centrifuging.

* * * * *